United States Patent [19]

Wakui

[11] Patent Number: 5,648,816
[45] Date of Patent: Jul. 15, 1997

[54] STILL VIDEO CAMERA INCLUDING DETACHABLY ATTACHABLE EXTERNAL MEMORY

[75] Inventor: Yoshio Wakui, Tokyo, Japan

[73] Assignee: Asahi Kogaku Kogyo Kabushiki Kaisha, Tokyo, Japan

[21] Appl. No.: 594,806

[22] Filed: Jan. 31, 1996

[30] Foreign Application Priority Data

Jan. 31, 1995 [JP] Japan .................. 7-036087
Jan. 31, 1995 [JP] Japan .................. 7-036088
Jan. 31, 1995 [JP] Japan .................. 7-036089

[51] Int. Cl.$^6$ ............................................ H04N 5/76
[52] U.S. Cl. .................................. 348/233; 348/232
[58] Field of Search ........................... 348/222, 231, 348/232, 233; 358/909.1, 906; H04N 15/76

[56] References Cited

U.S. PATENT DOCUMENTS 5,049,911  9/1991  Shimizu .
5,111,299  5/1992  Aoki et al. .
5,231,501  7/1993  Sakai .
5,262,868  11/1993  Kaneko .................. 348/233
5,341,489  8/1994  Heiberger .............. 348/231
5,477,264  12/1995  Sarbadhikari .......... 348/231

*Primary Examiner*—Sherrie Hsia
*Attorney, Agent, or Firm*—Greenblum & Bernstein P.L.C.

[57] ABSTRACT

A still video camera includes an image pickup device with a non-volatile memory incorporated in the camera, wherein an image taken by the image pickup device can be recorded or an image recorded in the non-volatile memory can be erased. An external memory, which is detachably attached by a connector portion to the camera, may also be used to store images taken by the image pickup device. The still video camera includes a connection detecting device which detects the connection between the connector portion and the external memory. A recording device records image signals representative of the image taken by the image pickup device in the non-volatile memory or the external memory. The recording device records the image signals in the external memory when the connection between the connector portion and the external memory is detected by the connection detecting device.

19 Claims, 14 Drawing Sheets

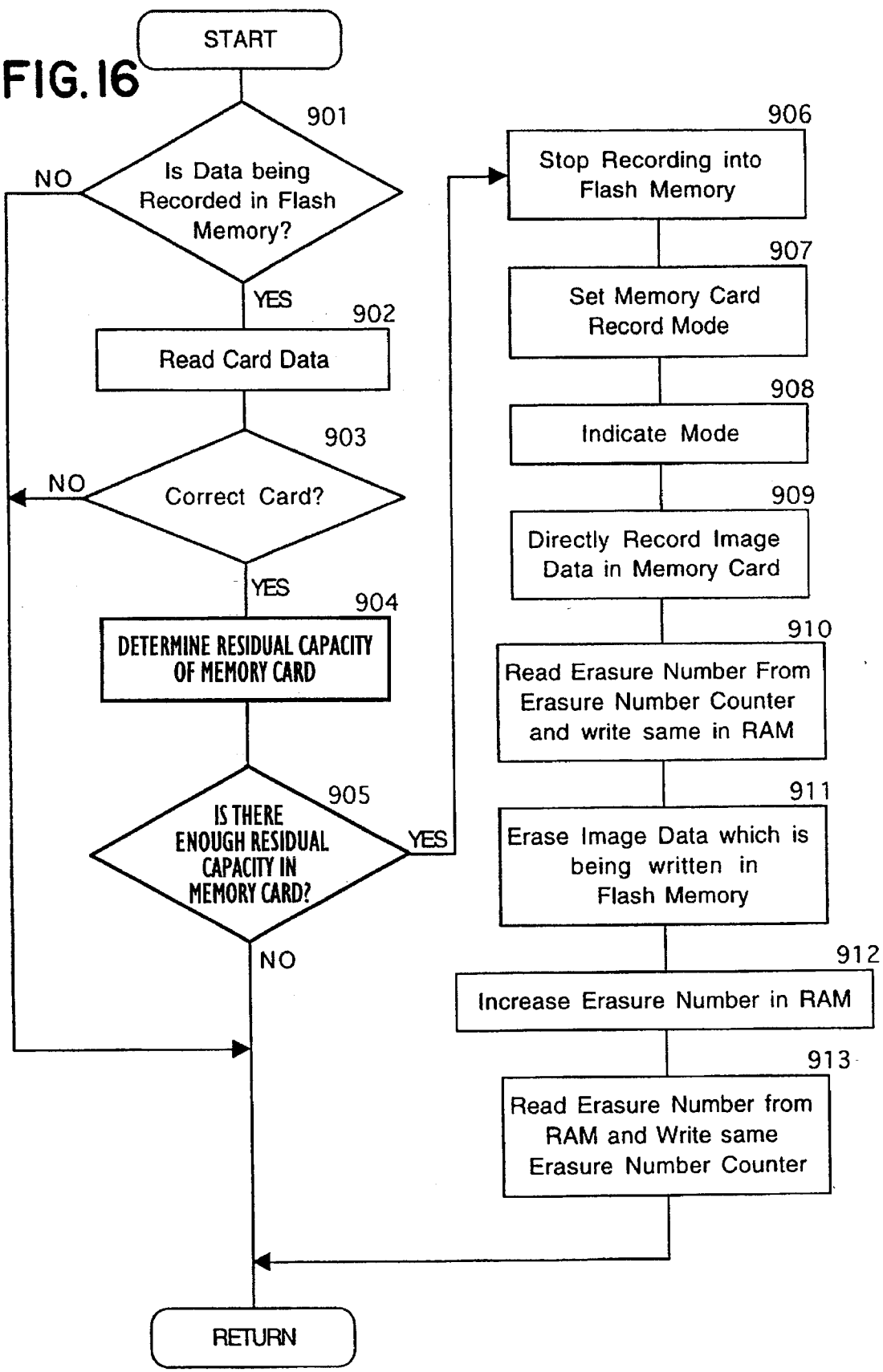

STILL VIDEO CAMERA INCLUDING DETACHABLY ATTACHABLE EXTERNAL MEMORY

BACKGROUND OF THE INVENTION

1. Field of the Invention

The present invention relates to a still video camera having an internal flash memory and an external card-type memory which can be detachably attached to the still video camera.

2. Description of Related Art

A still video camera is known having a flash memory (non-volatile memory) in which data can be erased and rewritten, incorporated therein, in which picked-up image data is recorded (stored) in the flash memory.

The flash memory has a large storage capacity and is inexpensive. Also, with a flash memory, no backup battery is necessary to retain up the stored data. However, the number of times data to be retained can be rewritten is limited. Hence, repetitive writing and erasing of the image data causes a reduction in the reliability of the stored data, thus resulting in a deterioration in the S/N (signal-to-noise) ratio of the reproduced image.

SUMMARY OF THE INVENTION

It is an object of the present invention to provide a still video camera employing an image recording non-volatile memory in which data can be erased and rewritten, wherein the service life of the non-volatile memory can be increased.

Another object of the present invention is to provide a still video camera employing a rewritable and erasable non-volatile memory, in which a recording can be switched from the non-volatile memory to an external memory, even during the recording operation of the image signals in the non-volatile memory.

Still another object of the present invention is to provide a still video camera employing a rewritable and erasable non-volatile memory, in which the reliability of data recorded in the non-volatile memory can be enhanced.

According to an aspect of the present invention, there is provided a still video camera having an image pickup portion. A non-volatile memory is also incorporated in the camera, in which an image taken by the image pickup portion can be recorded or the recorded image can be erased. A connecting portion is provided to which an external memory can be electrically connected. The external memory is detachably attached to the camera and can store therein the image taken by the image pickup portion. A recording device records the image signals of the image taken by the image pickup portion in the non-volatile memory or the external memory. The recording device preferentially records the image signals in the external memory when the external memory is connected to the connecting means.

It is possible to provide a connection detecting device which detects the connection between the connecting portion and the external memory. In this case, the recording device preferentially records the image signals in the external memory when the connection between the connecting portion and the external memory is detected by the connection detecting device.

Preferably, the still video camera further comprises a first remaining (residual) capacity detecting device for detecting the remaining storage capacity of the external memory. The recording device records the image signals in the external memory when the connection between the connecting portion and the external memory is detected by the connection detecting device and when the first remaining capacity detecting device detects that a storage capacity necessary to record the image signals for at least one image remains in the external memory.

It is also possible to provide a second remaining (residual) capacity detecting device for detecting the remaining storage capacity of the non-volatile memory. The recording device records the image signals in the non-volatile memory when no data can be recorded in the external memory and when the second remaining capacity detecting device has detected that a storage capacity necessary to record the image signals for at least one image remains in the non-volatile memory.

The external memory can be an IC memory incorporated in an IC memory card.

According to another aspect of the present invention, there is provided a still video camera having an image pickup portion. A non-volatile memory is also incorporated in the camera, in which an image taken by the image pickup portion can be recorded or the recorded image can be erased. A connecting portion is provided to which an external memory can be electrically connected. The external memory is detachably attached to the camera and can store therein the image taken by the image pickup portion. A connection detecting device detects the connection between the connecting portion and the external memory. A recording device records the image signals of the image taken by the image pickup portion in the non-volatile memory or the external memory. If the connection between the connecting portion and the external memory is detected by the connection detecting device during recording of the image signals in the non-volatile memory, the recording device stops recording the image signals in the non-volatile memory, and instead records the image signals in the external memory.

According to yet another aspect of the present invention, there is provided a still video camera having an image pickup portion. A non-volatile memory is also incorporated in the camera, in which an image taken by the image pickup portion can be recorded or the recorded image can be erased. A connecting portion is provided to which an external memory can be electrically connected. The external memory is detachably attached to the camera and can store therein the image taken by the image pickup portion. A connection detecting device detects the connection between the connecting portion and the external memory. A first remaining capacity detecting device is provided for detecting the remaining storage capacity of the external memory. A recording device records image signals of the image taken by the image pickup portion in the non-volatile memory or the external memory. If the connection between the connecting portion and the external memory is detected by the connection detecting device and if the first remaining capacity detecting device detects that a storage capacity necessary to record the image signals for at least one image remains in the external memory during recording of the image signals in the non-volatile memory, the recording device stops recording the image signals in the non-volatile memory, and instead records the image signals in the external memory.

It is possible to provide an erasing device for erasing the image signals recorded in the non-volatile memory or the external memory. The erasing device erases the image signals recorded in the non-volatile memory after recording of the image signals in the non-volatile memory has stopped.

According to still another aspect of the present invention, a still video camera includes an image pickup portion. A non-volatile memory is also incorporated in the camera, in which an image taken by the image pickup portion can be recorded or the recorded image can be erased. The non-volatile memory being provided with a plurality of recording unit areas. A connecting portion is provided to which an external memory can be electrically connected. The external memory is detachably attached to the camera and which can store therein the image taken by the image pickup portion. A recording device records image signals of the image taken by the image pickup portion in the non-volatile memory or the external memory. An erasing device erases the image signals recorded at least in the non-volatile memory. A record judging device detects the number of erasing operations in each recording unit area of the non-volatile memory to thereby judge whether or not data can be recorded in the recording unit area. The recording device performs or prohibits the recording operation of the image signals in the recording unit area, in accordance with the judgement of the record judging device.

The recording unit areas can each be provided with an erasure number recording portion in which erasure number data which represents the number of erasing operations in the associated recording unit areas is recorded. In this connection, the recording device records the number of erasing operations in the erasure number recording portions every time data recorded in the recording unit areas of the non-volatile memory is erased by the erasing device. The record judging device detects the number of erasing operations based on the erasure number data and compares the detected erasure number with a guaranteed erasure number, so that if the detected erasure number is above the guaranteed erasure number, it is judged that no data is permitted to be recorded in the associated recording unit areas.

Preferably, the recording device preferentially records the image signals in the recording unit area corresponding to the smallest erasure number, selected from the recording unit areas whose erasure number is less than the guaranteed erasure number.

Further provision can be made for a record prohibition data recording portion in which data representing whether the recording unit areas are those in which no image signal is permitted to record is recorded.

According to still another aspect of the present invention, there is provided a still video camera having an image pickup device.

A non-volatile memory is incorporated in the camera, in which an image taken by the image pickup device can be recorded or the recorded image can be erased. The non-volatile memory being provided with a plurality of recording unit areas. A recording device for recording image signals of the image taken by the image pickup device in the non-volatile memory along with recording time. A recording time allotting device for allotting a frame number to the image signals recorded in the non-volatile memory in which the image signals has been recorded in order of the record time.

It is possible to provide an erasing device for erasing the image signals recorded in the non-volatile memory in order of the frame number.

The present disclosure relates to subject matter contained in three Japanese Patent Applications No. 7-36087 (filed on Jan. 31, 1995), No. 7-36088 (filed on Jan. 31, 1995) and No. 7-36089 (filed on Jan. 31, 1995), which are expressly incorporated herein by reference in their entireties.

BRIEF DESCRIPTION OF THE DRAWINGS

The invention will be described below in detail with reference to the accompanying drawings, in which.

DESCRIPTION OF THE PREFERRED EMBODIMENT

Embodiments of a still video camera according to the present invention will be discussed below.

Figure 1:
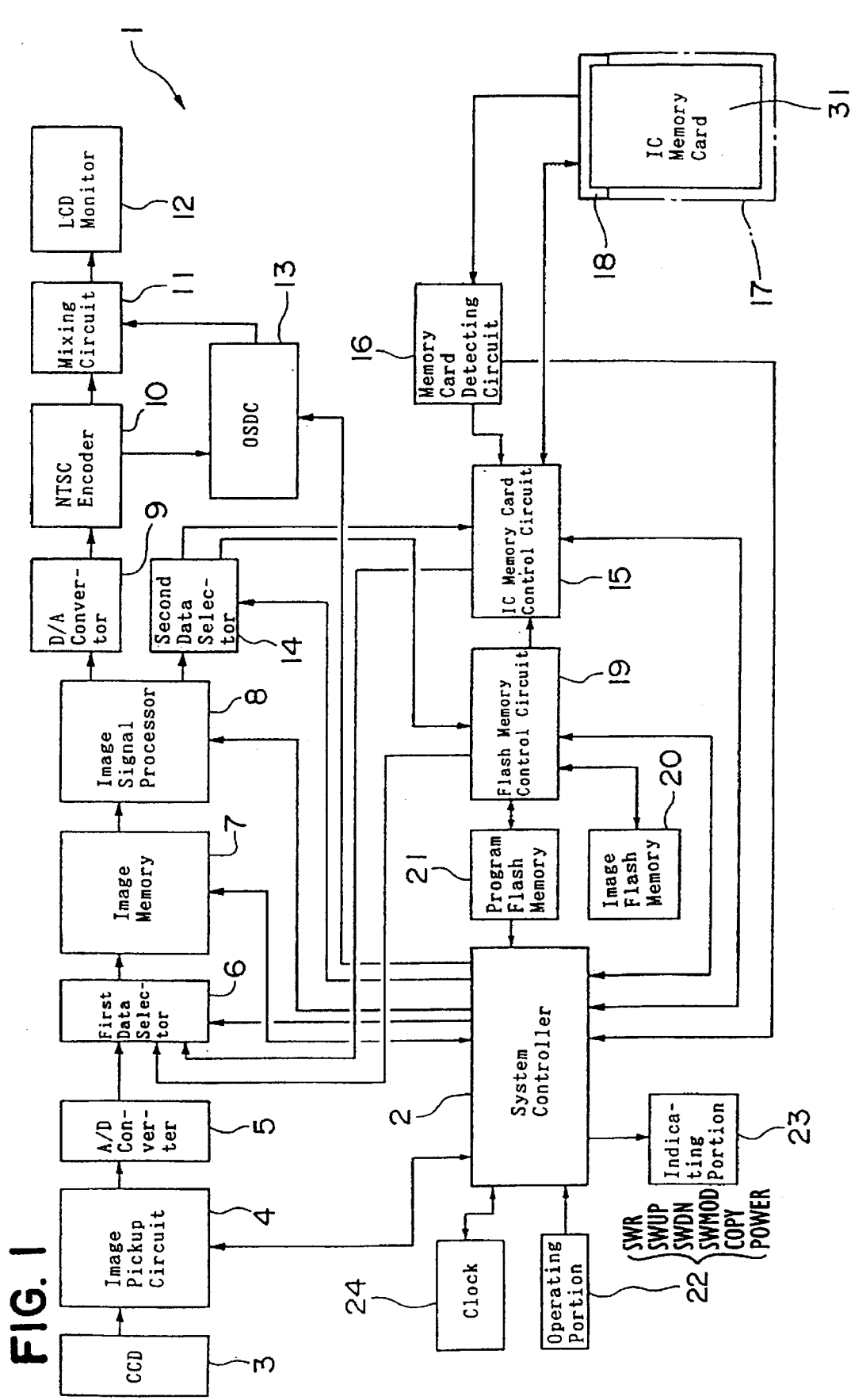
FIG. 1 is a block diagram showing circuitry of a still video camera, according to the present invention.

FIG. 1 is a block diagram showing circuitry of a still video camera. The still video camera (electronic still camera) 1 is comprised of a camera body (not shown), a photographing optical system (not shown), a finder optical system (not shown), a photographing portion having a CCD (solid state image pickup device) 3 and an image pickup circuit 4, and an LCD monitor (liquid crystal display monitor) 12.

The CCD 3 has a large number of pixels arranged in a matrix to accumulate electric charges corresponding to the quantity of light to be received thereby. The accumulated electric charges are successively transferred at predetermined times to the image pickup circuit 4. The CCD 3 is located at an image pickup surface behind the photographing optical system.

The input terminal of the image pickup circuit 4 is connected to the output terminal of the CCD 3, to control the CCD 3 and read the signals therefrom.

In the still video camera 1 according to the illustrated embodiment, for color images for example, a CCD having a complementary color filter is used as the CCD 3. Each picture element (minimum unit) of the CCD 3 is provided with a filter to separate a magenta component (Mg), a yellow component (Ye), a cyan component (Cy), and a green component (G), from the object light. The four picture elements having the Mg, Ye, Cy and G filters constitute one unit which constitutes one pixel on an image plane. The object image is formed on the light receiving surface of the CCD 3 by the photographing optical system.

The still video camera 1 has a system controller (control means) 2. The system controller 2 may include, for example, a microcomputer which controls various functions of the still video camera 1, such as sequence control, etc. Namely, the system controller 2 controls the image pickup circuit 4, a first data selector 6, an image memory 7, an image signal processor 8, an OSDC (On Screen Display Controller) 13, a second data selector 14, an IC memory card control circuit 15, a flash memory control circuit 19, an indicating portion 23, and a clock (clock IC) 24, etc. The clock 24 indicates "year-month-day" and "hour-minute-second".

The system controller 2 is connected to an operating portion 22 which is provided with a power switch (main switch), a release switch SWR, an up/down switch (SWUP/SWDN), a mode selection switch SWMOD to select a record mode, a play-back mode, an erasing mode and a copy switch, etc.

The indicating portion 23 indicates through an LCD display (liquid crystal display) or a light emitting element etc., an ON/OFF state of the power switch etc.; the mode selected from among the record mode, the play-back mode and the erasing mode; the mode selected from among the memory card record mode, the flash memory record mode and the record prohibition mode; and, photographing data, such as the date of photographing, the time of photographing, a presence or absence of the IC memory card 31, in accordance with need.

The camera body of the still video camera 1 is provided with a loading portion 17 in which the IC memory card 31 is loaded, and an ejector switch (not shown) which is actuated to eject the IC memory card 31. The loading portion 17 is provided therein with a connector 18.

The IC memory card 31 is a card-type external memory which can be detachably attached to the still video camera 1 and which has an IC (Integrated Circuit) memory RAM to record (or store) the images taken by the still video camera 1. The IC memory is provided with a first area in which the image signal (image data) is recorded, and a second area in which data inherent to the IC memory card is recorded. The inherent data includes, for example, the type of the IC memory (e.g., static RAM or flash memory, etc.), the storage capacity of the IC memory, access speed, etc.

The connector 18 is connected to the IC memory card control circuit 15 which generally controls the writing and reading operations of data in and from the IC memory card 31, respectively. The IC memory card control circuit 15 functions as a remaining memory capacity detecting means to detect the remaining storage capacity of the IC memory card 31. Namely, data on the remaining storage capacity of the IC memory card 31 is read from the IC memory card 31 and is supplied to the system controller 2, in the course of a record mode setting operation and a card inserting interruption operation, which will be discussed hereinafter.

The still video camera 1 has a memory card detecting circuit (connection detecting means) 16 which detects the loading of the IC memory card 31 in the loading portion 17 of the still video camera 1, i.e., the electrical connection between the terminal of the IC memory card 31 and the terminal of the connector 18. The memory card detecting circuit 16 is connected to the connector 18, the system controller 2 and the IC memory card control circuit 15.

If the terminal of the IC memory card 31 is correctly connected to the terminal of the connector 18, the ground terminal element (not shown) is grounded. This is detected by the memory card detecting circuit 16, so that a low level signal "L" is supplied from the memory card detecting circuit 16 to the system controller 2 and the IC memory card control circuit 15. If the terminal of the IC memory card 31 fails to correctly connect to the terminal of the connector 18, a high level signal "H" is supplied from the memory card detecting circuit 16 to the system controller 2 and the IC memory card control circuit 15. Thus, the system control circuit 2 detects whether or not the electrical connection between the terminal of the IC memory card 31 and the terminal of the connector 18 is established, i.e., whether or not the IC memory card 31 is correctly loaded in the loading portion 17.

The IC memory card 31 is manually inserted in the loading portion 17, by an operator, through an insertion opening until the IC memory card reaches the innermost end portion of the loading portion. After the IC memory card reaches the innermost end of the loading portion, the IC memory card 31 is further depressed inward until the terminal of the IC memory card 31 is connected to the terminal of the connector 18. Moreover, the loading portion 17 is provided therein with a card ejection mechanism (not shown) which is actuated when the ejector switch is actuated to discharge the IC memory card 31 from the loading portion 17. Furthermore, the still video camera 1 includes an image flash memory (flash memory for an image EEPROM) 20, a program flash memory (flash memory for a program EEPROM) 21 and a flash memory control circuit 19 which generally controls the image flash memory 20 and the program flash memory 21 to write or read data therein and therefrom. The flash memory control circuit 19 functions also as a detecting means (non-volatile memory vacant capacity detecting means) for detecting the remaining capacity (vacant capacity, or recordable area) of the image flash memory circuit 20. Upon setting the record mode, the remaining capacity data of the image flash memory 20 is read and supplied to the system controller 2.

The flash memory control circuit 19, the IC memory card control circuit 15, and the system controller 2 constitute a recording means for recording the image data (image signals) in the image flash memory 20 or the IC memory card 31 and an erasing means for erasing the data recorded in the image flash memory 20 or the IC memory card 31.

The flash memory control circuit 19 and the system controller 2 constitute a record judging means for judging whether or not recording (rewriting) can be effected by detecting the number of erasing operations of each block (recording unit area) of the image flash memory 20.

The image flash memory 20 is a non-volatile memory (rewritable and erasable memory) in which the image taken by the still video camera 1 is stored or recorded. The program flash memory 21 is a non-volatile memory (rewritable and erasable memory) in which a program for data communication with the IC memory card 31 is stored or recorded. The image flash memory 20 and the program flash memory 21 are each provided with a plurality of blocks (recording unit areas) wherein data in each block can be erased at one time. The image flash memory 20 will be discussed below.

Figure 2:
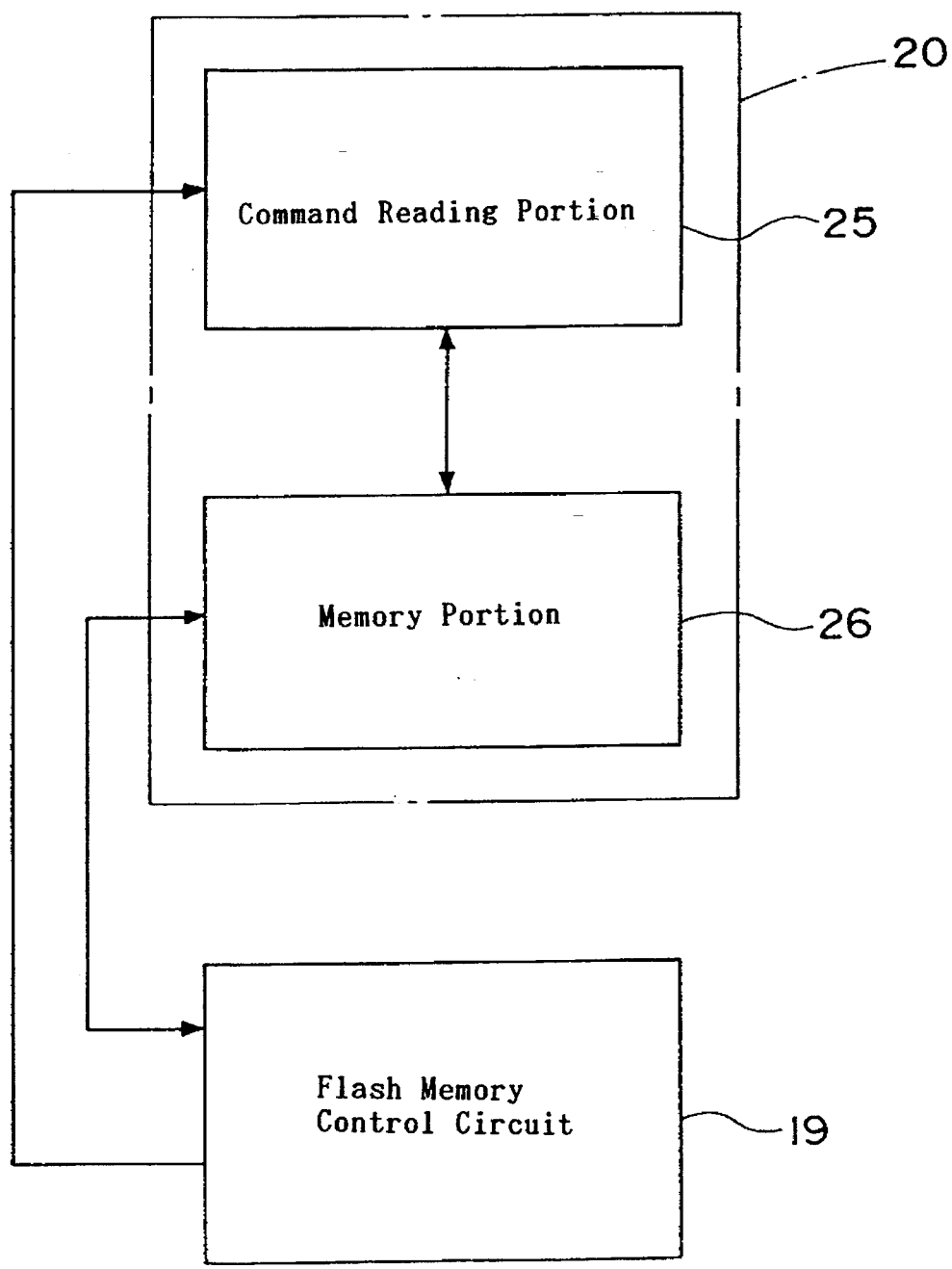
FIG. 2 is a block diagram of an image storing flash memory in a still video camera, according to the present invention.

FIG. 2 shows a block diagram of the image flash memory 20 by way of example.

In FIG. 2, the image flash memory 20 is comprised of a command reading portion 25 and a memory portion 26 which is electrically connected to the command reading portion.

Figure 3:
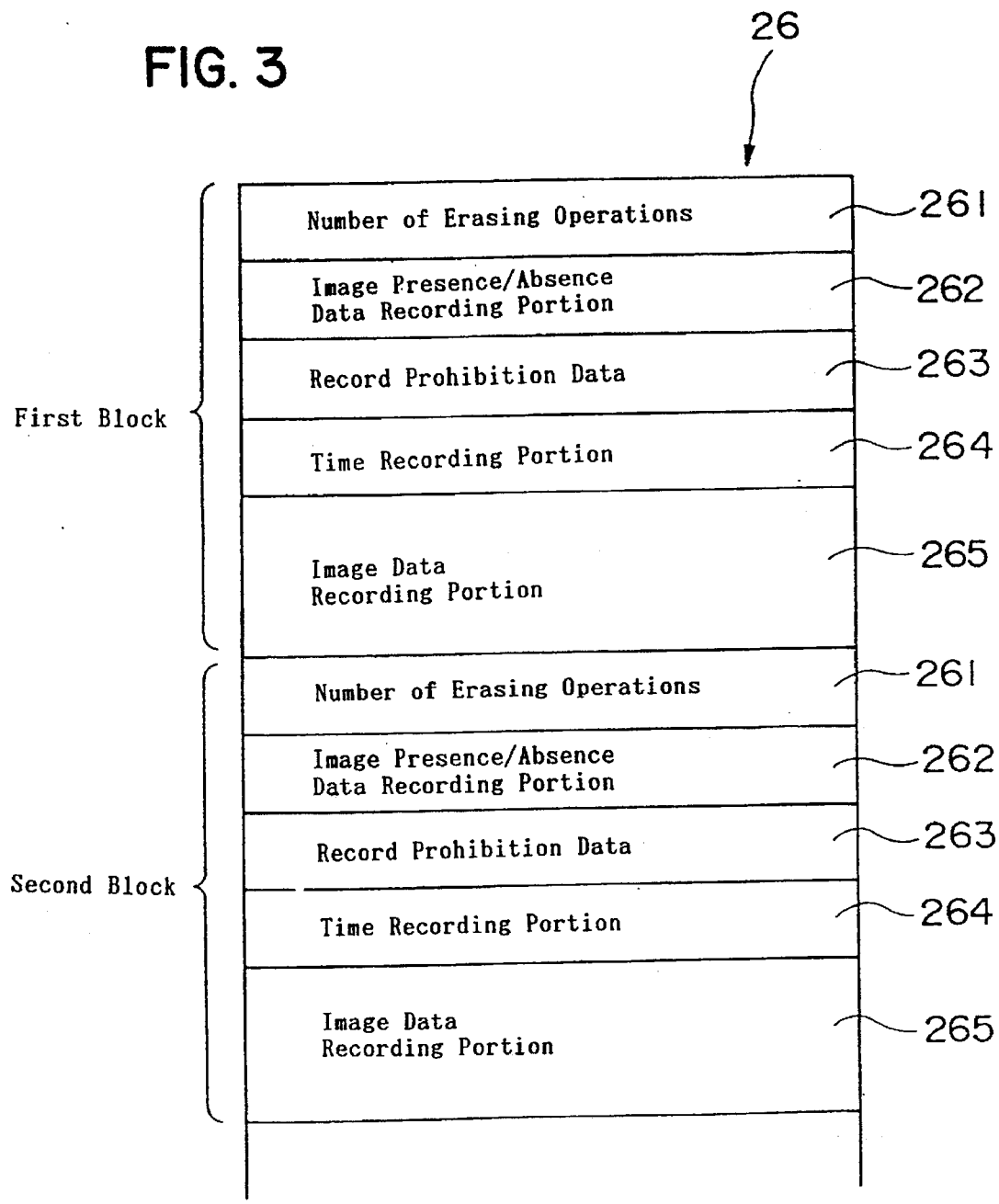
FIG. 3 is a schematic view of a memory portion of a flash memory in a still video camera, according to the present invention.

FIG. 3 shows an example of an internal structure of the memory portion 26 of the image flash memory 20. In FIG. 3, the memory portion 26 of the image flash memory 20 is comprised of a plurality of blocks (N blocks, wherein N is an integer more than 1). Each of the blocks includes an erasure number counter (erasure number recording portion) 261, an image presence/absence data recording portion 262, a record prohibition data recording portion 263, a time recording portion 264 and an image data recording portion 265.

The number of erasing operations for each block, i.e., data representing the number of erasures of the data recorded in the associated block, is recorded in the erasure number counter 261 of each block.

The image data (image signals) is recorded in the image data recording portion 265 of each block. In the illustrated embodiment, one image is recorded in one block.

Image presence/absence data which represents the presence or absence of image data in the image data recording portion 265 is recorded in the image presence/absence data recording portion 262. If image data has been recorded, "0" which represents the presence of the image data, is recorded, and if no image data is recorded, "1" which represents the absence of image data, is recorded. Thus, the system controller 2 can judge whether or not image data has been recorded in each block.

If the data is erased, all the associated bits become "1" in the flash memory. If the image of a certain block is erased, the signal of the image Presence/absence data recording portion 262 of that block is automatically recorded "1". In other words, if the image presence/absence data recording portion 262 of a block is "1", it means that the image signal can be recorded in the image data recording portion 265. Likewise, the signal "0" is recorded in the image Presence/absence data recording portion 262 when image data is recorded again.

Data which represents whether or not the blocks are those in which the recording of image data is prohibited is recorded in the record prohibition data recording portions 263. If a block is prohibited from recording, the signal "0" is recorded, and if a block is not prohibited from recording, the signal "1" is recorded. Thus, the system controller 2 can judge whether a block is one of those prohibited from recording.

Note that data is prohibited from being recorded in those blocks in which the number of erasing operations is above the guaranteed number of erasures. The signal "0" representing those blocks that are prohibited from recording is recorded in the record prohibition data recording portions 263 thereof, in the still video camera 1, according to the present invention.

The data representing "year-month-day" and "hour-minute-second" (i.e., time) at which the image data is recorded, is recorded in the time recording portions 264 of the respective blocks.

To record image data in the image flash memory 20 or erase recorded data from the image flash memory 20, the system controller 2 actuates the flash memory control circuit 19 to input the command code (command data) to the command reading portion 25 of the image flash memory 20 from the flash memory control circuit 19.

The command reading portion 25 decodes the command code input thereto. The data is recorded in or erased from the memory portion 26 in accordance with the command code.

Note that the flash memory control circuit 19 is connected to the IC memory card control circuit 15, and the program flash memory 21 is connected to the system controller 2, respectively.

The operation of the still video camera 1 will now be described.

When the mode selection switch is actuated, the mode setting command signal, i.e., the record mode setting command signal, the play-back mode setting command signal or the erasure mode setting command signal, is input to the system control circuit 2. Even if the mode selection switch is not actuated, when the IC card memory 31 is inserted in, or withdrawn from, the loading portion 17, any one of the three mode setting command signals is input to the system controller 2.

Figure 4:
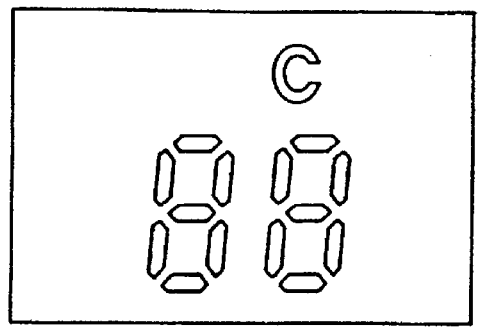
FIG. 4 is a schematic view of an indication of a memory card record mode in a display in a still video camera, according to the present invention.
Figure 5:
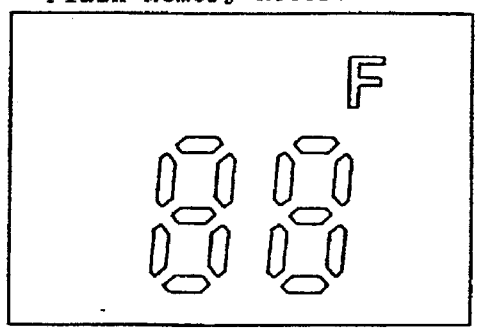
FIG. 5 is a schematic view of an indication of a flash memory record mode in a display in a still video camera, according to the present invention.
Figure 6:
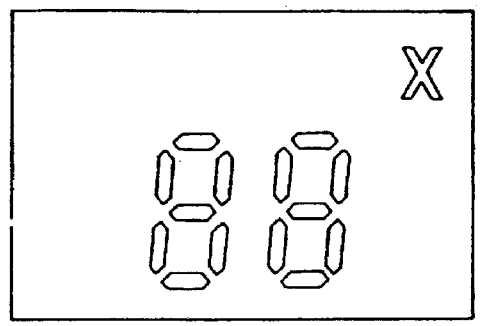
FIG. 6 is a schematic view of an indication of a record prohibition mode in a display in a still video camera, according to the present invention.

The system controller 2 sets the operation mode to be either a "record mode", a "play-back mode" or an "erasure mode", in accordance with the mode setting command signal. When the "record mode" is set, the "memory card record mode" at which the data is recorded in the IC memory card 31, the "flash memory record mode" at which data is recorded in the image flash memory 20 or the "record prohibition mode" at which no data can be recorded in the IC memory card 31 or the image flash memory 20, is set, as will be discussed hereinafter. FIGS. 4, 5 and 6 show examples of an indication of the indicating portion 23 in the memory card record mode, the flash memory record mode and the record prohibition mode, respectively.

When the memory card record mode is set as shown in FIG. 4, the letter "C" appears in the upper portion of the indicating portion 23. When the flash memory record mode is set as shown in FIG. 5, the letter "F" appears in the upper portion of the indicating portion 23. When the record prohibition mode is set as shown in FIG. 6, the letter "X" appears in the upper portion of the indicating portion 23.

If the release switch is turned ON when the record mode, the play-back mode or the erasure mode is set, the record trigger signal, the play-back trigger signal, or the erasure trigger signal is input to the system controller 2, respectively. The recording (photographing) operation, the play-back operation (commencement or termination of play-back) or the erasing operation is executed in accordance with the record trigger signal, the play-back trigger signal or the erasure trigger signal, respectively.

The following discussion will be representatively directed to the record and play-back operations for the image flash memory 20, and the record and play-back operations for the IC memory card 31. Note that the image data is primarily recorded in the IC memory card 31. However, if the IC memory card is not loaded in the loading portion 17, or the IC memory card 31 has no remaining storage capacity to store data so that no data can be recorded in the IC memory card 31, the data is then recorded in the image flash memory 20.

1) "Recording of Data in the Image Flash Memory 20"

When the record mode command signal is input to the system controller 2 in accordance with the operation of the mode selection switch by an operator (photographer), the record mode is set by the system controller 2.

If the terminal of the IC memory card 31 is not correctly connected to the terminal of the connector 18, or if there is not enough remaining storage capacity for the image data associated with one image in the IC memory card 31, and if the number of erasing operations is less than the guaranteed number of erasures and there is a vacant block in which no data is recorded in the image flash memory 20, the flash memory record mode is set by the system controller 2.

If the release switch is turned ON in the flash memory record mode, the exposure operation is carried out by the CCD 3 under predetermined exposure conditions. Consequently, electric charges corresponding to the quantity of light of an object to be photographed are accumulated in the pixels of the CCD 3. The accumulated charges are successively transferred to the image pickup circuit 4.

The signals output from the CCD 3 are processed in the image pickup circuit 4 to obtain analog image signals of the object image, i.e., magenta, yellow, cyan and green components. The analog signals are converted by the A/D converter 5 into digital signals, i.e., digital complementary color signals of magenta, yellow, and cyan components and a digital primary color signal of the green component. These digital signals pass through the first data selector 6 which selects the address to which the data is to be supplied and are stored in the image memory 7 at predetermined addresses thereof. The switching operation of the data selector 6 is controlled by the system controller 2. Thereafter, the digital image signals are read from the predetermined addresses in the image memory 7. The digital image signals thus read are input to the image signal processing circuit 8 which processes the digital complementary color signals of magenta, yellow and cyan components and the digital primary color signal of the green component to obtain a luminance (brightness) signal (Y), a red color difference signal (Cr) and a blue color difference signal (Cb).

The brightness signal (Y), the red color difference signal (Cr) and the blue color difference signal (Cb) are selected by the second data selector 14, which selects an address to which the data is to be supplied, and are input to the flash memory control circuit 19. The signals are then recorded in the image data recording portion 265 of the predetermined blocks of the image flash memory 20 by the flash memory control circuit 19. The switching operation of the second data selector 14 is controlled by the system controller 2.

2) "Reproduction of Data from Image Flash Memory 20"

As mentioned above, when the play-back mode setting command signal is input to the system controller 2 in accordance with the operation of the mode selection switch by an operator, the play-back mode (reproduction mode) is set by the system controller 2.

If the release switch is turned ON when the terminal of the IC memory card 31 is not correctly connected to the terminal of the connector 18 in the play-back mode, the brightness signal (Y), the red color difference signal (Cr) and the blue color difference signal (Cb) are read from the image data recording portions 265 of the blocks of the image flash memory 20 by the flash memory control circuit 19 and are then written in the image memory 7 at predetermined addresses through the first data selector 6. The switching operation of the data selector 6 is controlled by the system controller 2.

Thereafter, the digital image signals are read from the image memory 7 at the predetermined addresses.

The brightness signal (Y), the red color difference signal (Cr), and the blue color difference signal (Cb) are read from the image memory 7 at predetermined addresses. The brightness signal (Y), the red color difference signal (Cr) and the blue color difference signal (Cb), thus read are supplied to the image processor 8, and are then converted into analog signals by the D/A converter 9, before being input to the NTSC encoder 10. The NTSC encoder produces standard TV signals (video signals) for an NTSC system, based on the brightness signal (Y), the red color difference signal (Cr) and the blue color difference signal (Cb), and synchronization signals which are supplied from a synchronization signal generating circuit (not shown) to the NTSC encoder 10. The video signals are supplied from the NTSC encoder 10, to a mixing circuit 11, and the synchronization signals (vertical synchronization signal and horizontal synchronization signal) are supplied from the NTSC encoder 10 to the OSDC (On Screen Display Controller) 13.

The OSDC 13 generates character signals corresponding to the frame number of the reproduced image (played-back image) and supplies the same to the mixing circuit 11, in synchronization with the synchronization signals supplied from the NTSC encoder 10 to the OSDC 13.

The mixing circuit 11 combines the video signals supplied from the NTSC encoder 10 and the character signals supplied from the OSDC 13. The combined signals are supplied to the LCD monitor 12 and are reproduced thereby. Consequently, the reproduced images on which the frame numbers are superposed are displayed. Thereafter, the reproduction is stopped when the release switch is turned ON.

3) "Recording of Data in the IC Memory Card 31"

When the record mode setting command signal is input to the system controller 2 in accordance with the operation of the mode selection switch by an operator, the record mode is set by the system controller 2.

If the terminal of the IC memory card 31 is correctly connected to the terminal of the connector 18, and the remaining storage capacity of the IC memory card 31 is sufficient for the image data of one image, the memory card record mode is set by the system controller 2.

If the release switch is turned ON in the memory card record mode, the exposure operation is carried out for the CCD 3 under predetermined exposure conditions, similar to the recording operation of data in the image flash memory 20 mentioned above. Consequently, electric charges are accumulated in the pixels of the CCD 3 and are successively transferred to the image pickup circuit 4. The signals output from the CCD 3 are processed in the image pickup circuit 4 to obtain analog image signals of the object image. The analog signals are converted by the A/D converter 5 into digital image signals. The digital signals pass through the first data selector 6 and are stored in the image memory 7 at predetermined addresses thereof. The switching operation of the data selector 6 is controlled by the system controller 2. Thereafter, the digital image signals are read from the image memory 7 at the predetermined addresses. The digital image signals thus read are input to the image signal processing circuit 8 to obtain a brightness signal (Y), a red color difference signal (Cr), and a blue color difference signal (Cb).

The brightness signal (Y), the red color difference signal (Cr) and the blue color difference signal (Cb) are selected by the second data selector 14 and are supplied to the IC memory card control circuit 15. The signals are then recorded in the IC memory of the IC memory card 31 at predetermined addresses thereof by the IC memory card control circuit 15. The switching operation of the second data selector 14 is controlled by the system controller 2.

The still video camera 1 also has a function to transfer the image data from the image flash memory 20 to the IC memory card 31.

If the copy switch is turned ON when the terminal of the IC memory card 31 is correctly connected to the terminal of the connector 18, and the storage capacity within the IC memory card 31 is sufficient for data associated with one image, the brightness signal (Y), the red color difference signal (Cr) and the blue color difference signal (Cb) are read from the image data recording portions 265 of the blocks of the image flash memory 20 by the flash memory control circuit 19 and are then supplied to the IC memory control circuit 15, through which the data is recorded in the IC memory of the IC memory card 31 at predetermined addresses. The copy operation (transfer operation) of the image data is omitted in the flow chart which will be discussed hereinafter.

4) "Reproduction of Data from IC Memory Card 31"

As mentioned above, when the play-back mode setting command signal is input to the system controller 2 in accordance with the operation of the mode selection switch by an operator, the play-back mode (reproduction mode) is set by the system controller 2.

If the release switch is turned ON when the terminal of the IC memory card 31 is correctly connected to the terminal of the connector 18 in the play-back mode, the brightness signal (Y), the red color difference signal (Cr) and the blue color difference signal (Cb) are read from the IC memory of the IC memory card 31 at the predetermined addresses by the IC memory card control circuit 15, and are then written in the image memory 7 at predetermined addresses through the first data selector 6. The switching operation of the data selector 6 is controlled by the system controller 2.

Similar to the reproduction of the data from the image flash memory 20, the brightness signal (Y), the red color difference signal (Cr) and the blue color difference signal (Cb) are read from the image memory 7 at predetermined addresses. The brightness signal (Y), the red color difference signal (Cr) and the blue color difference signal (Cb), thus read are supplied to the image processor 8, and are then converted into analog signals by the D/A converter 9, to be input to the NTSC encoder 10 which produces standard TV signals (video signals) for an NTSC system. The video signals are supplied to the mixing circuit 11 from the NTSC encoder 10. The mixing circuit 11 combines the video signals supplied from the NTSC encoder 10 and the character signals supplied from the OSDC 13. The combined signals are supplied to the LCD monitor 12 and are reproduced therein. Consequently, the reproduced images on which the frame numbers are superposed are displayed. Thereafter, the reproduction is stopped when the release switch is turned OFF.

The control operation of the system controller 2 in the still video camera 1 according to the present invention will be discussed below.

Figure 7:
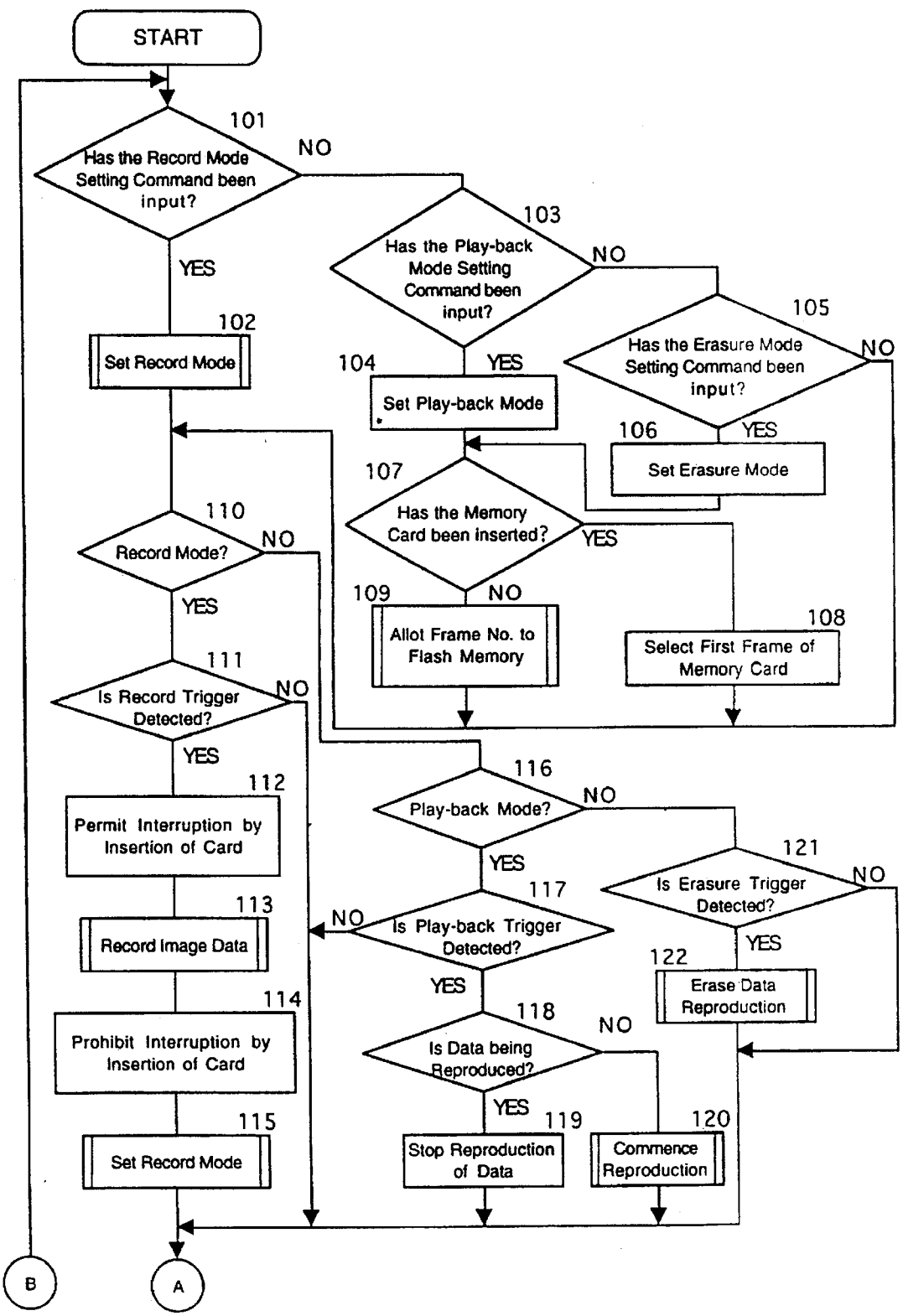
FIGS. 7 and 8 are flow charts showing sequential operations of a system controller in a still video camera, according to the present invention.
Figure 8:
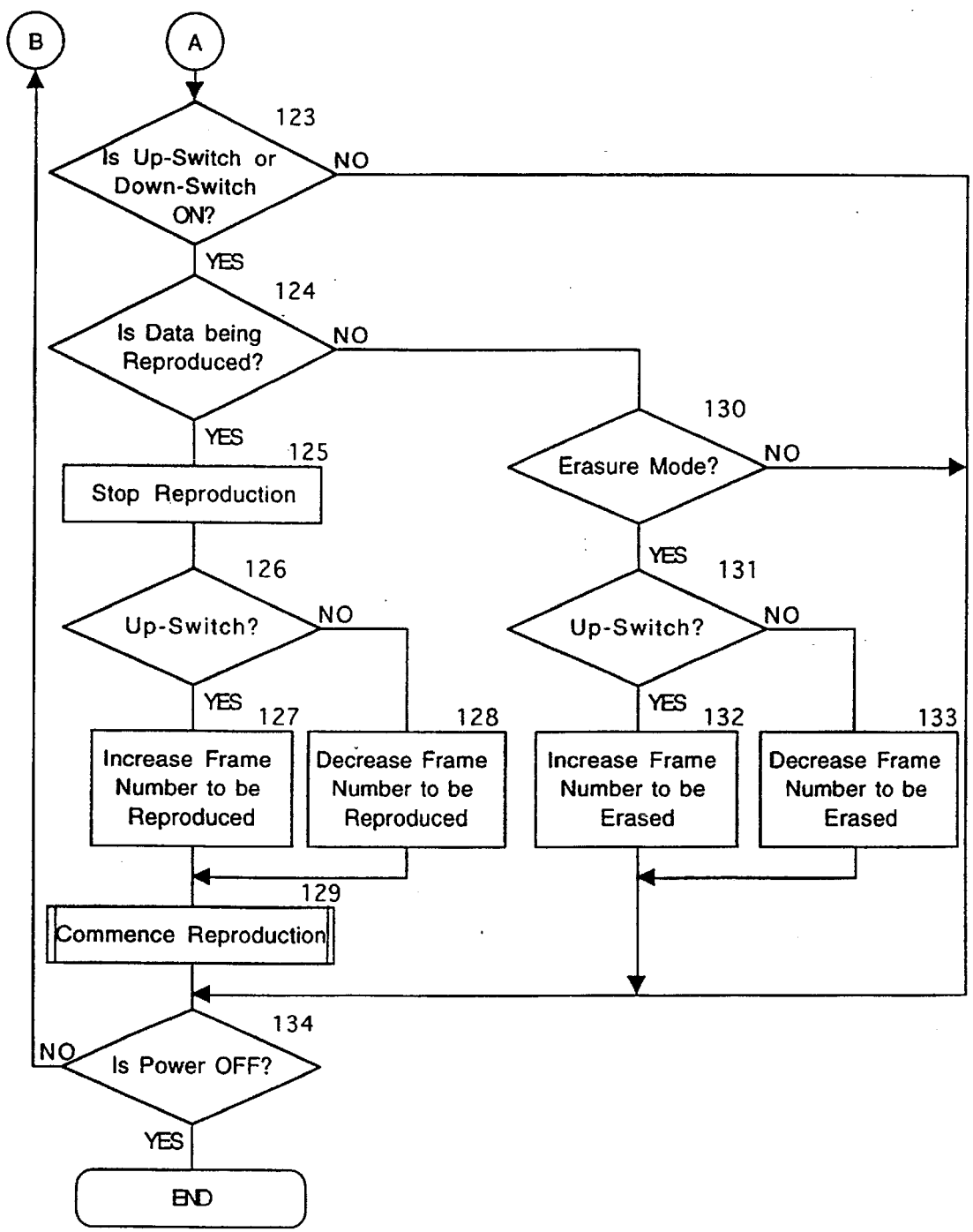

FIGS. 7 and 8 show flow charts of the operations of the system controller 2. Note that the sub-routines in the main routine, i.e., "record mode setting routine" at steps 102 and 115, "flash memory frame number allotting routine" at step 109, "reproduction starting routine" at steps 120 and 129, and "erasure routine" at step 122 are discussed hereinafter. Also, the "card insertion interruption routine" at steps 112 and 114 will be discussed hereinafter. The Record Image Data subroutine is discussed hereinafter with reference to FIG. 13 in conjunction with the recording of data in the IC Memory Card 31 and the image flash memory 20, discussed hereinbefore.

(1) Main Routine:

When the mode selection switch is actuated or the IC memory card 31 is inserted in or ejected from the loading portion of the still video camera 1, the mode setting command signal is sent to the system controller 2. Whether the record mode setting command signal has been input is checked at step 101 when the power switch (main switch) is turned ON. If the record mode setting command signal has been input, the record mode is set at step 102.

If no record mode setting command signal has been input at step 101, whether the play-back mode setting command signal has been input is checked at step 103. If the play-back mode setting command signal has been input, the play-back mode is set at step 104.

If no play-back setting command signal has been input at step 103, whether the erasure mode setting command signal has been input is checked at step 105. If the erasure mode setting command signal has been input, the erasure mode is set at step 106.

At step 107, it is determined if the IC memory card 31 is in place, i.e., whether the IC memory card 31 is inserted in the loading portion 17 is checked based on the data from the memory card detection circuit 16. At step 107, if the terminal of the IC memory card 31 is connected to the terminal of the connector 18 of the loading portion 17, it is judged that the IC memory card 31 is loaded (presence of the IC memory card), and conversely, if the terminal of the IC memory card 31 is not connected to the terminal of the connector 18 of the loading portion 17, it is judged that no IC memory card 31 is loaded (absence of the IC memory card).

If the presence of the IC memory card 31 is detected at step 107, the first frame of the IC memory card 31, i.e., the frame No. 1, is selected as a frame in or from which data is to be recorded or erased (step 108). In order to control the frame number of the IC memory card 31, for example, the file name contains numerals representing the frame number.

At step 107, if the absence of the IC memory card 31 is detected, the frame number allotting operation is carried out in which the frame number is allotted to the image recorded in the image flash memory 20 (step 109). After the process at step 109, or if the erasure mode setting command signal has not been input at step 105, control proceeds to step 110 to check whether the operation mode is the record mode.

If the operation mode is the record mode at step 110, whether the release switch (recording trigger) is turned ON is checked at step 111. If the recording trigger is detected, the interruption of the control to insert the IC memory card is permitted (step 112), which will be described below.

Thereafter, the data is recorded (step 113) and the card insertion interruption is prohibited (step 114). The record mode is then set at step 115.

If the operation mode is not the record mode at step 110, control proceeds to step 116 to check if the operation mode is the play-back mode. If the operation mode is the play-back mode, the release switch is checked to determine if it is turned ON (i.e., play-back trigger is detected) is checked at step 117.

If the play-back trigger is detected at step 117, whether the data is being played-back (reproduced) is checked at step 118. If the data is being reproduced, the reproduction is stopped (step 119). If the data is not being reproduced at step 118, control proceeds to step 120 to commence the reproduction.

If the operation mode is not the play-back mode at step 116, whether the release switch is turned ON (i.e., whether the erasure trigger is detected) is checked (step 121). If the erasure trigger is detected, the data is erased at step 122.

If no record trigger is detected at step 111 or at step 117, or no erasure trigger is detected at step 121, or after the operation at step 115, 119 or 120 is completed, whether the up-switch SWUP or the down-switch SWDN is turned ON is checked at step 123.

If the up-switch SWUP or the down-switch SWDN is turned ON at step 123, control proceeds to step 124 to check whether the data is being played-back (reproduced). If the data is being reproduced, the reproduction is stopped at step 125.

Thereafter, the state of the up-switch SWUP is checked to determine if SWUP is ON (step 126). If the up-switch SWUP is ON, the frame number to be reproduced is increased by one (step 127). Conversely, if the down-switch SWDN is ON, the frame number to be reproduced is decreased by one (step 128). Thereafter, the reproduction is commenced (step 129).

If no image is being reproduced at step 124, whether the operation mode is the erasure mode is checked (step 130). If the operation mode is the erasure mode, whether the up-switch SWUP is ON is checked (step 131).

If the up-switch SWUP is ON at step 131, the frame number to be erased is increased by one. Conversely, if the down-switch SWDN is ON at step 131, the frame number to be erased is decreased by one (step 133).

If the up-switch SWUP or the down-switch SWDN is turned OFF at step 123 (i.e., the up-switch SWUP or the down-switch SWDN is not operated), or if the operation mode is not the erasure mode at step 130, or after the operation at step 129, 132 or 133 is completed, it is then determined if the power switch is turned OFF (step 134).

If the power switch is turned ON at step 134, control is returned to step 101 to perform the operation thereat. If the power switch is turned OFF at step 134, the program ends.

The sub-routines in the main routine, i.e., the "record mode setting routine" at steps 102 and 115, the "frame number allotting routine" at step 109, the "reproduction starting routine" at steps 120 and 129, the "record image data" at step 113, and the "erasure routine" at step 122 will be discussed below.

(2) Record Mode Setting Routine

Figure 9:
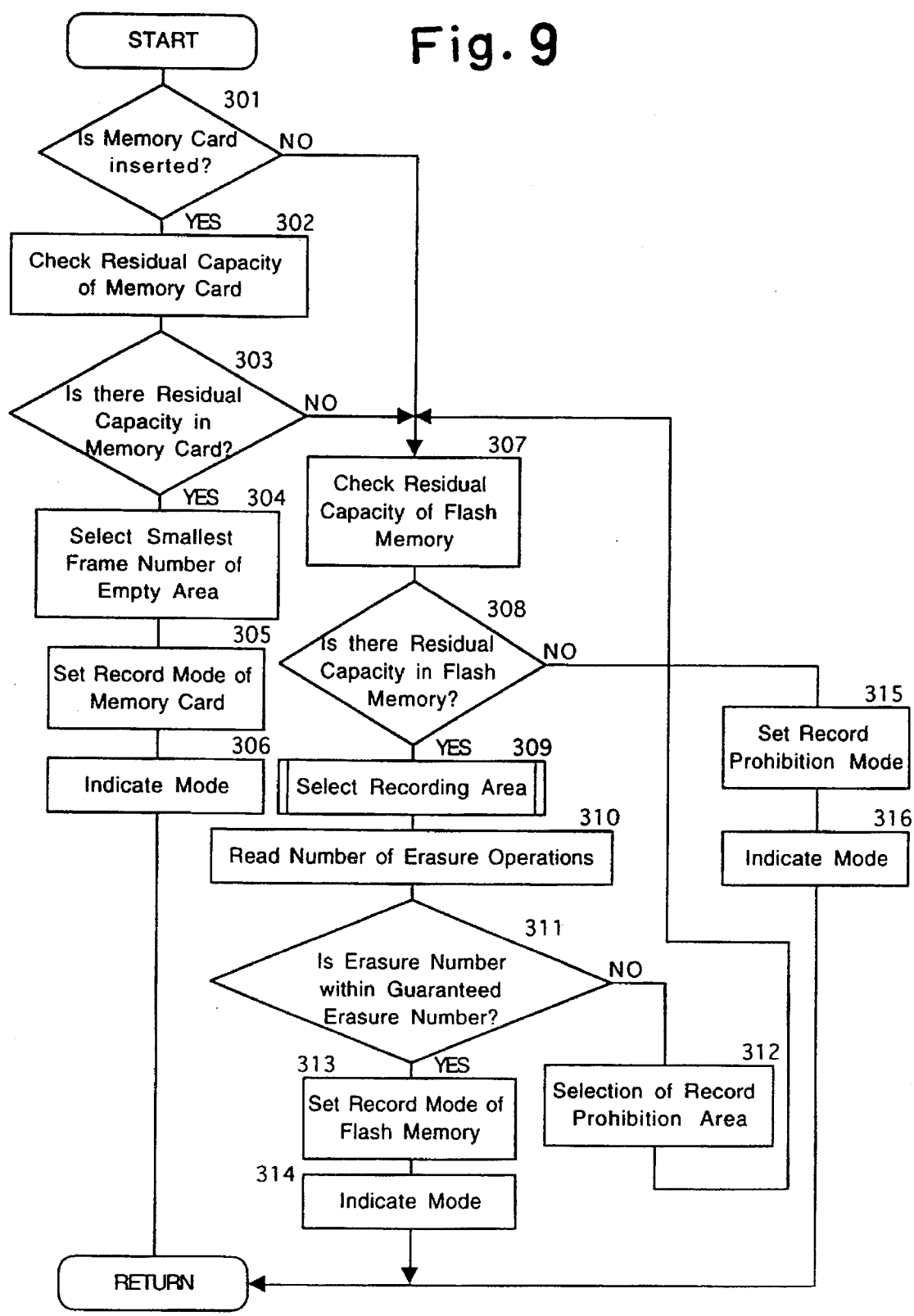
FIG. 9 is a flow chart showing record mode setting operations of a system controller in a still video camera, according to the present invention.

FIG. 9 shows a flow chart of the operation of the system controller 2 to set the record mode. Note that the "recording area selection" operation at step 309 will be discussed later with reference to FIG. 10.

At step 301, it is checked to determine if the IC memory card 31 is inserted, based on the data from the memory card detecting circuit 16. At step 301, if the terminal of the IC memory card 31 is connected to the terminal of the connector 18 of the loading portion 17, it is judged that the IC memory card 31 is loaded (presence of the IC memory card), and conversely, if the terminal of the IC memory card 31 is not connected to the terminal of the connector 18 of the loading portion 17, it is judged that no IC memory card 31 is loaded (absence of the IC memory card).

If the presence of the IC memory card 31 is detected at step 301, the remaining capacity of the IC memory card 31 is detected (step 302). Namely, information regarding the remaining capacity of the IC memory card 31 is read from the IC memory card 31 by the IC memory card control circuit 15 and is supplied to the system controller 2.

Thereafter, whether or not there is remaining memory capacity in the IC memory card 31 is checked (step 303). When there is a memory capacity for storing the image data for at least one image in the IC memory card 31, it is judged that the IC memory card 31 has a remaining capacity. Otherwise, the IC memory card 31 is judged to have no remaining memory capacity.

If it is judged that the IC memory card 31 has remaining memory capacity at step 303, the smallest frame number of the vacant memory area is selected as a frame in which the image data is to be recorded (step 304).

Thereafter, the memory card record mode is set to record the image data in the IC memory card 31 (step 305). After that, the memory card record mode is indicated in the indicating portion 23, as shown in FIG. 4 (step 306).

If no IC memory card 31 is inserted in the loading portion at step 301, or if the IC memory card 31 has no remaining memory capacity at step 303, the capacity of the image flash memory 20 is detected (step 307).

At step 307, data is read from the image presence or absence data recording portion 262 and the record prohibition data recording portion 263 of each block of the image flash memory 20 and is supplied to the system controller 2. If the data read from the image presence or absence data recording portion 262 and the record prohibition data recording portion 263 is represented by a combination of (1, 1), it is judged that the data can be recorded in the associated block, but if the data is represented by another combination, i.e., (1, 0), (0, 1), or (0, 0), it is judged that no data can be recorded in the block.

Thereafter, whether the image flash memory 20 has a remaining memory capacity is checked (step 308). In this connection, if there is at least one block in which the image data can be recorded, it is judged that the image flash memory has a memory capacity, but if there is no block in which the image data can be recorded, it is judged that there is no memory capacity remaining in the image flash memory 20.

If the image flash memory 20 has remaining memory capacity at step 308, the selection of the recording area, i.e., the selection of the block of the image flash memory in which the image data is to be recorded, is carried out (step 309).

Thereafter, the number of erasing operations of the selected block is detected by the erasure number counter 261 (step 310).

After that, it is checked if the detected erasure number is above the guaranteed number of erasures (step 311). If the detected erasure number is above the guaranteed number of erasures at step 311, the selected block is designated to be a record prohibition area (record prohibition block) at step 312. At step 312, the signal "0" is written in the record prohibition data recording portion 263 of the selected block.

The guaranteed number of erasures refers to the upper limit of the number of the erasing operations within which the data recorded in the image flash memory 20 is warranted. For example, the guaranteed number of erasures is predetermined and stored in the program memory 21 when still video cameras are shipped from a factory.

Control is then returned from step 312 to step 307 to repeat the operations at step 307 and the subsequent steps.

If the detected number of erasures is within the guaranteed number of erasures at step 311, the flash memory record mode is set to record the image data in the image flash memory 20 (step 313).

Thereafter, the flash memory record mode is indicated in the indicating portion 23, as shown in FIG. 5 (step 314).

If the image flash memory 20 has no memory capacity at step 308, the record prohibition mode is set (step 315), and the record prohibition mode is indicated in the indicating portion 23 (step 316). The program ends at step 306, 314 or 316, and control is returned to the main routine.

(3) Record Area Selecting Routine

Figure 10:
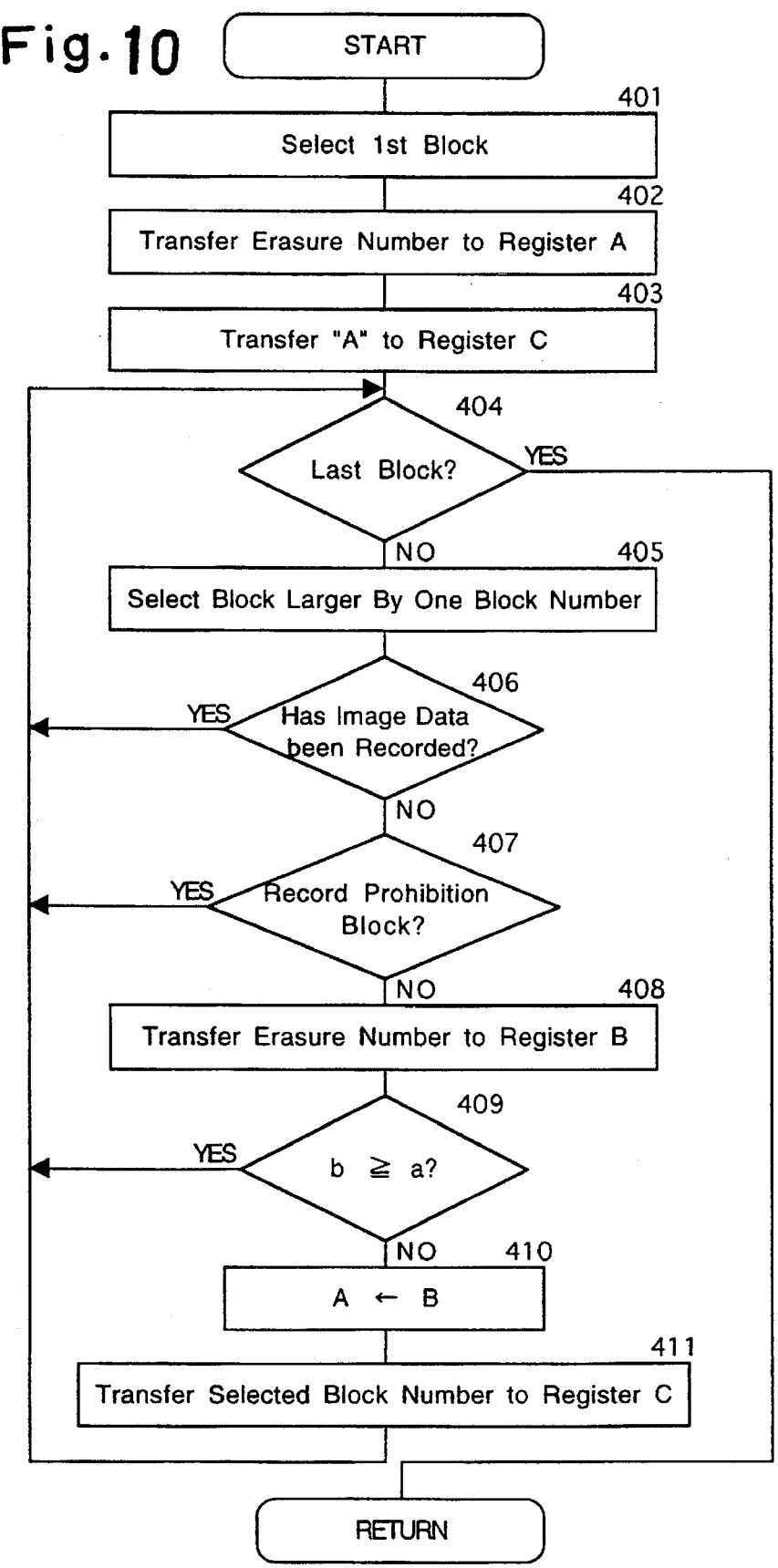
FIG. 10 is a flow chart showing recording area selecting operations of a system controller in a still video camera, according to the present invention.

FIG. 10 shows a flow chart of the operations of the system controller 2 to select the record area at step 309 in FIG. 9.

The first block of the image flash memory 20, i.e., the block No. 1 is selected (step 401).

Thereafter, the number of erasing operations of the first block is detected by the erasure number counter 261 and is transferred (written) to the register "A" of the system controller 2 (step 402).

After that, the block number "1" of the selected block is written in the register "C" of the system controller 2 (step 403). Thereafter, whether or not the selected block is the last block is checked (step 404). If the selected block is not the last block, the block number to be selected is increased by one, i.e., the block whose number is larger by one than the block number of the currently selected block is selected (step 405).

Thereafter, it is checked at step 406 whether the image data has been recorded in the image data recording portion 265. If the data read from the image presence or absence data recording portion 262 is "0", the image data has been recorded in the block, but if the data is "1", no data is recorded in the block.

If the data has been recorded at step 406, control is returned to step 404 to repeat the operations mentioned above.

If no data is recorded at step 406, whether the selected block is the record prohibition block is checked (step 407). If the data read from the record prohibition data recording portion 263 is "0", no data is permitted to be recorded in the block, but if the data is "1", the image data is permitted to be recorded in the block.

If the block is prohibited from recording at step 407, control is returned to step 404. Conversely, if the block is not prohibited from recording, the number of erasing operations is detected by the erasure number counter 261 and is written in the register "B" of the system controller 2 (step 408).

Thereafter, whether "b" (the number of erasures written in the register "B") is not less than "a" (the number of erasures written in the register "A"), i.e., b≧a is checked (step 409). If b≧a at step 409, control is returned to step 404 to repeat the operations mentioned above. If b<a at step 409, the number of erasures written in the register "B" of the system controller 2 is read and is written in the register "A" (step 410).

Thereafter, the block number of the selected block is transferred to and written in the register "C" of the system controller 2 (step 411). After that, control is returned to step 404 to repeat the above-mentioned operations.

If the selected block is the last block at step 404, the program ends, so that the control is returned to the record mode setting sub-routine.

The block whose block number is written in the register "C" of the system controller 2 is eventually selected to be a record area, i.e., a block in which the image data is to be recorded.

Thus, the block having the smallest number of erasing operations is preferentially selected to record the image data therein, so that the blocks always have a substantially identical number of erasing operations.

(4) Frame Number Allotting Routine for Flash Memory

Figure 11:
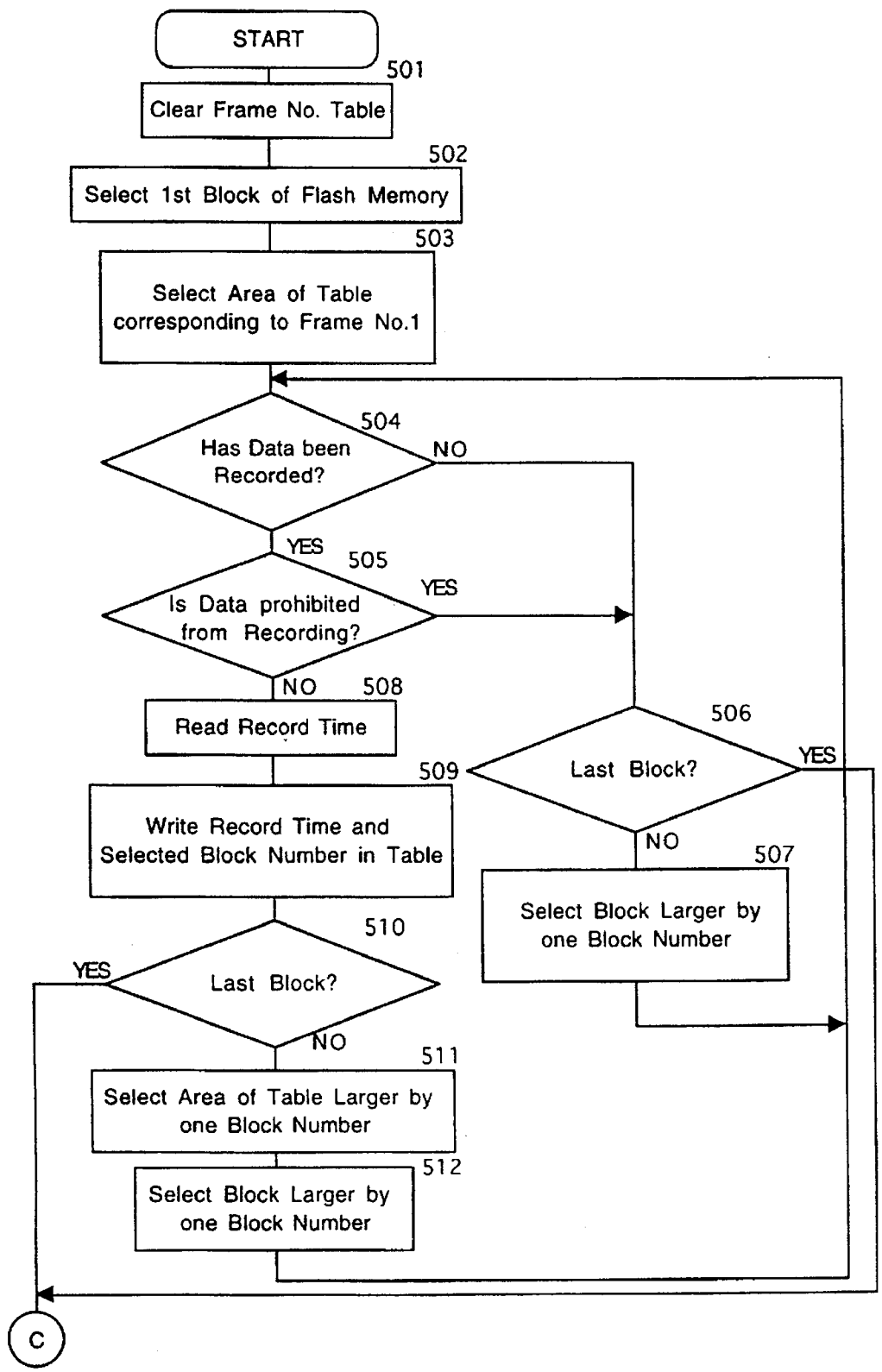
FIGS. 11 and 12 are flow charts showing sequential frame number allotting operations of a system controller in a still video camera, according to the present invention.
Figure 12:
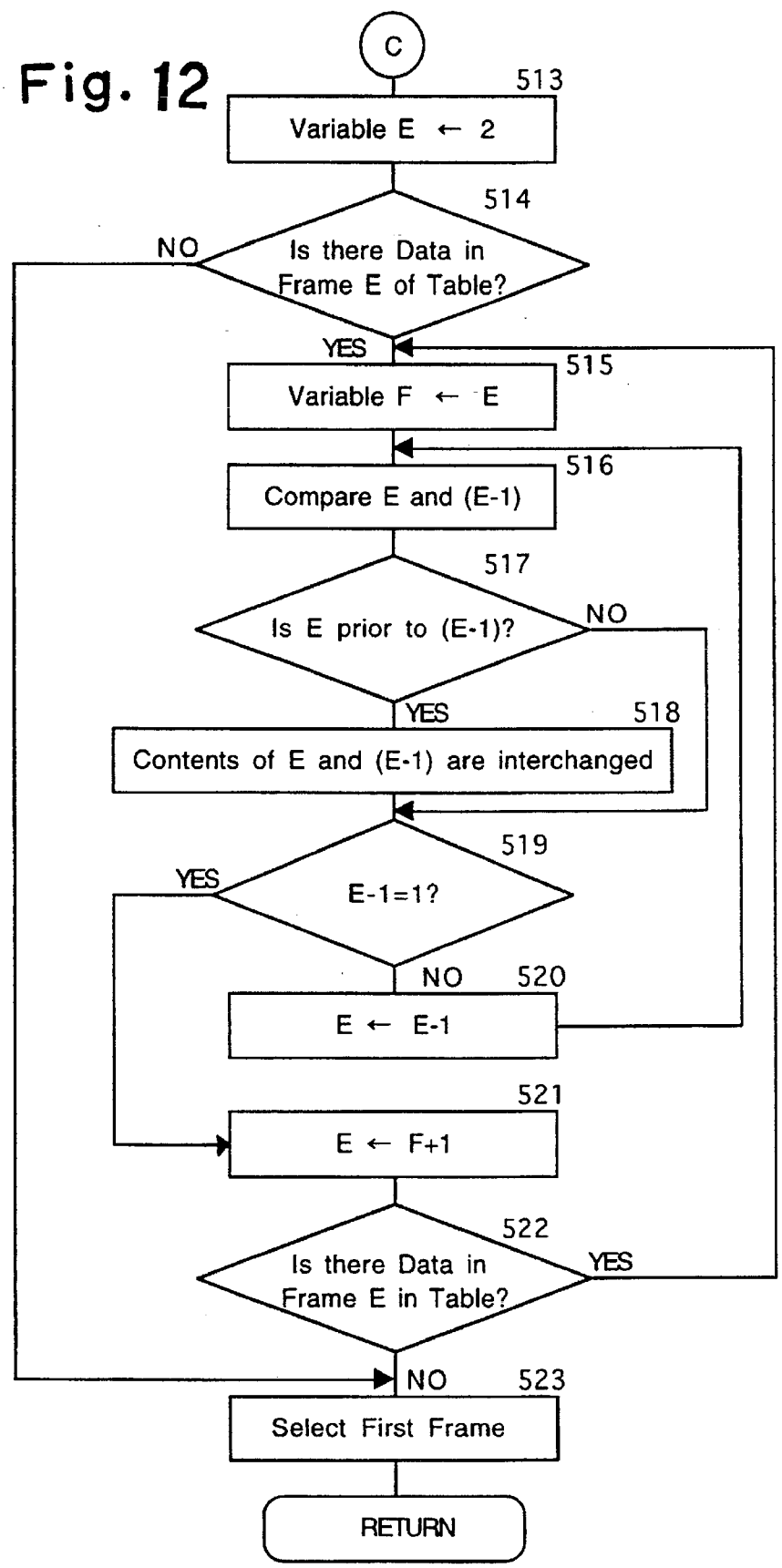

FIGS. 11 and 12 show flow charts of the operations of the system controller 2 to allot the frame number to the image recorded in the image flash memory 20, at step 109 in FIG. 7. In this routine, the frame number is allotted the image signals recorded blocks in the image flash memory 20 in which the data has been recorded in the order of the record time. The RAM of the system controller 2 stores a frame number table shown in Table 1 below.

TABLE 1

| Frame No. | Record Time | Block No. |
|---|---|---|
| 1 | | |
| 2 | | |
| 3 | | |
| 4 | | |
| 5 | | |
| 6 | | |
| . | | |
| . | | |
| . | | |

The record time and the block number shown in the frame number table (Table 1) are cleared (step 501). Note that the frame number on the frame number table is not cleared.

Thereafter, the first block of the image flash memory 20, i.e., the block No. 1 is selected (step 502). After that, the frame No. 1 on the frame number table is selected (step 503).

Thereafter, it is determined if image data has been recorded in the image data recording portion 265 of the selected block (step 504). At step 504, if the data read from the image presence or absence data recording portion 262 is "0", the image data has been recorded in the block, but if the data is "1", no data has been recorded in the block.

If the data has been recorded at step 504, whether the selected block is the record prohibition block is checked (step 505). If the data read from the record prohibition data recording portion 263 is "0", no data is permitted to be recorded in the block, but if the data is "1", the image data is permitted to be recorded in the block.

If the block is prohibited from being recording at step 505, or if no data is recorded at step 504, whether the selected block is the last block is checked at step 506. If the selected block is not the last block at step 506, the block number to be selected is increased by one, i.e., the block whose number is larger by one than the block number of the currently selected block is selected (step 507). Thereafter, control is returned to step 504.

If the selected block is not the record prohibition block, the record time of the image data is read by the time recording portion 264 of the selected block (step 508).

Thereafter, the record time and the block number of the selected block are written in the selected portions of the frame number table (step 509). After that, whether the selected block is the last block is checked (step 510). If the selected block is not the last block, the frame number to be selected on the frame number table is increased by one (step 511). Namely, the frame whose number is larger by one than the currently selected frame number is selected.

Thereafter, the block number to be selected is increased by one (step 512). Namely, the block whose number is larger by one than the currently selected block number is selected. After that, control is returned to step 504.

If the selected block is the last block at step 506 or at step 510, a variable E is set to 2 (E=2) at step 513.

In the processes until step 513, the record times and the block numbers of all of the blocks in which the image data has been recorded, and which are not prohibited from being recorded, are successively written. This writing operation begins at the frame No. 1 on the frame number table and is effected in the order of the block number.

Thereafter, whether data has been written in the frame E of the frame number table is checked (step 514). If data has been written in the frame E, a variable F is set to be identical to the value of E (step 515). Note that the frame E of the frame number table refers to the area (portion) of the frame number E.

Thereafter, the record time written in the frame E and the record time written in the frame (E−1) are compared (step 516). Whether the record time written in the frame E is earlier than the record time written in the frame (E−1) is checked at step 517.

If the record time written in the frame E is earlier than the record time written in the frame (E−1), the content (i.e., the record time and the block number) written in the frame E and the content (i.e., the record time and the block number) written in the frame (E−1) are interchanged (step 518). Namely, the record time and the block number written in the frame E are written in the frame (E−1) and the record time and the block number written in the frame (E−1) are written in the frame E.

Thereafter, whether E−1=1 is checked (step 519). If E−1≠1 at step 519, the variable E is set to be E−1 (step 520), and control is returned to step 516.

If E−1=1 at step 519, the variable E is set to be F+1 (step 521). At step 522, it is determined whether data has been written in the frame E of the frame number table. If data has been written in the frame E of the frame number table, control is returned to step 515.

If no data is written in the frame E of the frame number table at step 514 or step 522, the frame No. 1 is selected to reproduce or erase the image data (step 533). Hence, the program ends, and control is returned to the main routine.

Consequently, the record times and the block numbers of the image data of the blocks, written in the frame number table are arranged in the order of the record time from the earliest time to the latest time. Frame No. 1 corresponds to the earliest (oldest) record time, and is selected to reproduce or erase the image data, at step 122 in FIG. 7.

(5) Recording

Figure 13:
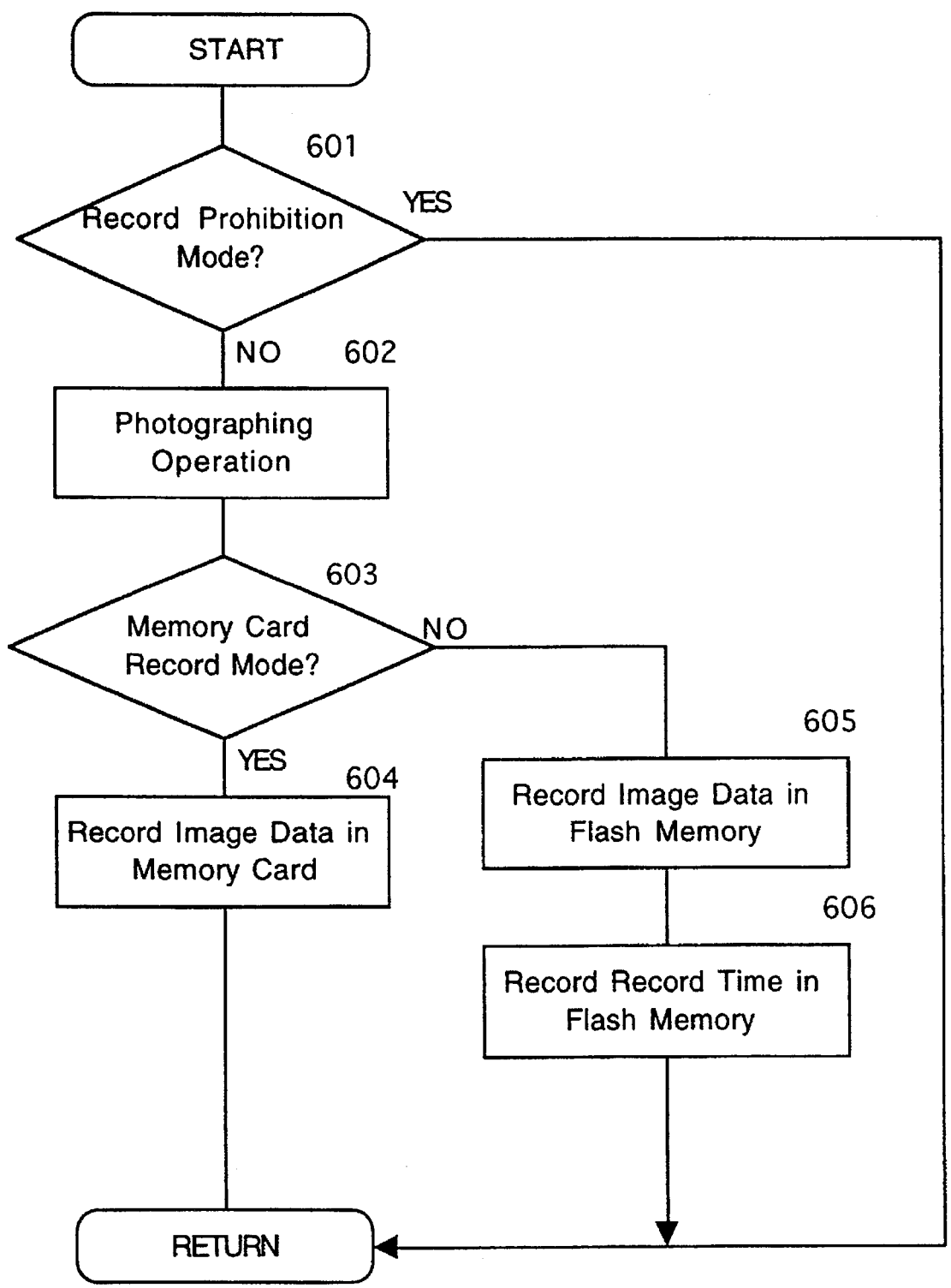
FIG. 13 is a flow chart showing recording operations of a system controller in a still video camera, according to the present invention.

FIG. 13 is a flow chart showing the operations of the system controller 2 to record the image data, at step 113 in FIG. 7.

The operation mode is checked at step 601 to determine if it is the record prohibition mode. If the operation mode is not the record prohibition mode, the photographing operation is carried out (step 602). At step 602, the exposure control of the CCD 3, the reading operation of the pixel data from the CCD 3 and the predetermined signal processing operation are effected to obtain image data for recording.

Thereafter, whether the operation mode is the memory card record mode is checked (step 603). If the operation mode is the memory card record mode, the image data is recorded in the selected record area of the IC memory card 31 by the IC memory card control circuit 15, as mentioned above (step 604).

If the operation mode is not the memory card record mode at step 603, the image data is recorded in the image data recording portion 265 of the selected block of the image flash memory 20 by the flash memory control circuit 19, as mentioned above (step 605). At step 605, the signal "0", which represents that the image data has been recorded, is written in the image presence/absence data recording portion 262 of the associated block in which the image data has been recorded, by the flash memory control circuit 19.

Thereafter, the record time of the image data is recorded in the time recording portion 264 of the block of the image flash memory 20 in which the image data has been recorded in accordance with the data from the clock 24 by the flash memory control circuit 19 (step 606).

If the operation mode is the record prohibition mode at step 601, no image data is recorded in the IC memory card 31 or the image flash memory 20. If the operation mode is the record prohibition mode at step 601 or if the operation at step 604 or step 606 is completed, the program ends and the control is returned to the main routine.

(6) Erasing Operation

Figure 14:
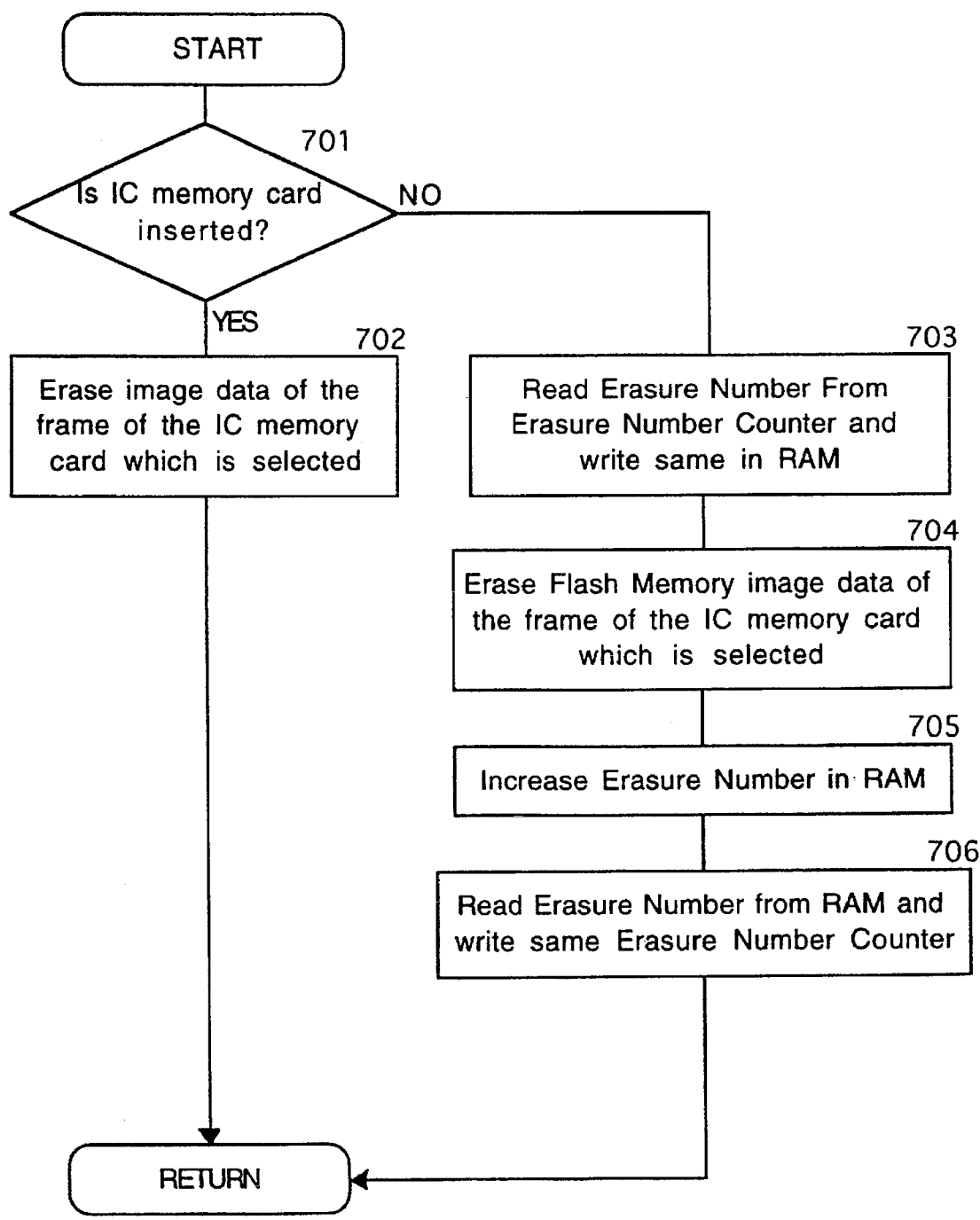
FIG. 14 is a flow chart showing erasing operations of a system controller in a still video camera, according to the present invention.

FIG. 14 is a flow chart showing the operations of the system controller 2 to erase the image data, at step 122 in FIG. 7.

At step 701, it is determined whether the IC memory card 31 is inserted in the loading portion in accordance with the data from the IC memory card detecting circuit 16 (step 701).

If the IC memory card 31 is inserted at step 701, the image data of the frame of the IC memory card 31, which is selected to erase the image data, is erased by the IC memory card control circuit 15 (step 702).

If no IC memory card 31 is inserted in the loading portion of the still video camera at step 701, the number of the erasing operations of the block, corresponding to the frame of the image flash memory 20 selected to erase, is read from the erasure number counter 261 by the flash memory control circuit 19 and is written in the RAM of the system controller 2 (step 703).

Thereafter, all data recorded in the block of the image flash memory 20 selected to erase the image data is erased by the flash memory control circuit 19 (step 704).

After that, the number of erasures written in the RAM of the system controller 2 is increased by one at step 705. Thereafter, the number of erasures is read from the RAM of the system controller 2 and is written in the erasure number counter 261 of the block from which the image data has been erased (step 706). Consequently, the program ends and control is returned to the main routine. As can be understood from the foregoing, in the still video camera 1 according to the present invention, a priority is afforded to erasing the data from the IC memory card 31.

(7) Commencement of Reproduction

Figure 15:
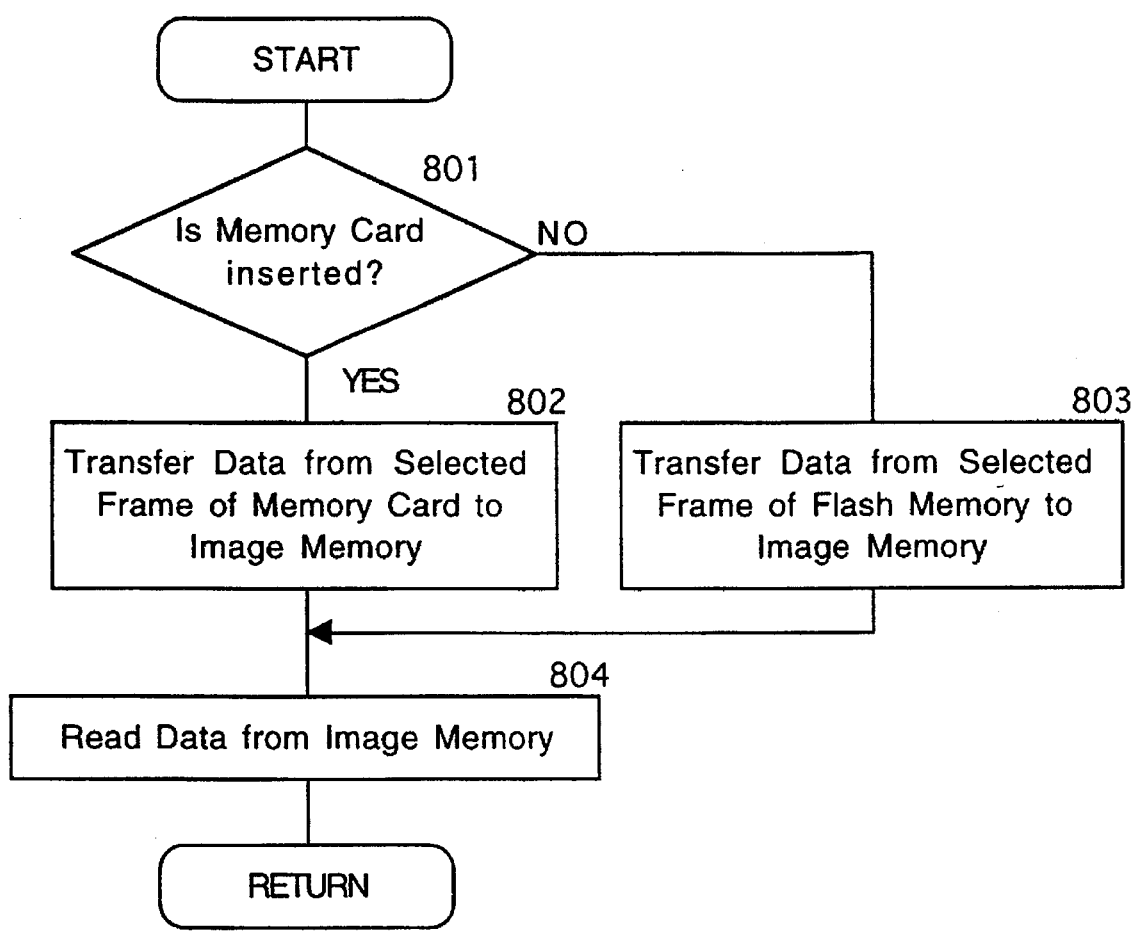
FIG. 15 is a flow chart showing reproducing operations of a system controller in a still video camera, according to the present invention; and, FIG. 16 is a flow chart showing card inserting interruption operations of a system controller in a still video camera, according to the present invention.

FIG. 15 is a flow chart showing the operations of the system controller 2 to commence the reproduction, at step 120 in FIG. 7 and at step 129 in FIG. 8.

Whether the IC memory card 31 is inserted in the loading portion is checked in accordance with the data from the memory card detection circuit 16 at step 801. At step 801, when the terminal of the IC memory card 31 is connected to the terminal of the connector 18 of the loading portion 17, the presence of the IC memory card 31 is detected, but when the terminal of the IC memory card 31 is not connected to the terminal of the connector 18 of the loading portion 17, the absence of the IC memory card 31 is detected.

If the presence of the IC memory card 31 is detected at step 801, the image data is read from the selected frame of the IC memory card 31 from which the image data is to be reproduced by the IC memory card control circuit 15, the image data is transferred to and written in the image memory 7 in step 802.

If the absence of the IC memory card 31 is detected at step 801, the image data is read from the selected frame of the image flash memory 20 from which the image data is to be reproduced, i.e., the image data recording portion 265 of the block from which the image data is to be reproduced, by the flash memory control circuit 19 and is transferred to and written in the image memory 7 (step 803).

Thereafter, the image data is read from the image memory 7 to reproduce the image (step 804). Namely, the image is displayed in the LCD monitor 12. Thus, the program ends and control is returned to the main routine. As can be seen from the foregoing, in the still video camera i according to the present invention, a priority is afforded to reproducing the image data recorded in the IC memory card 31.

The following discussion will be directed to the interruption of the main routine by the insertion of the IC memory card.

(8) Interruption by Insertion of Card

FIG. 16 is a flow chart showing the operations of the system controller 2 to interrupt the main routine when the IC memory card is inserted in the loading portion. The admit IC memory card interrupting operation is performed while steps 112–114 are in operation, namely, while the system controller 2 executes the recording subroutine (FIG. 13) in step 113.

The card insertion interruption operation is performed when the terminal of the IC memory card 31 is connected to the terminal of the connector 18 of the loading portion 17 in the interruption permission mode at which the insertion of the card is permitted to interrupt.

In the interruption operation at step 901, whether the image data is being recorded in the image flash memory 20 is checked. If the image data is being recorded in the image flash memory 20, the data (inherent data) inherent to the IC memory card is read from the IC memory card 31 by the IC memory card control circuit 15 (step 902).

Thereafter, whether the inserted IC memory card 31 is of a correct type is checked in accordance with the inherent data at step 903. Note that if no inherent data can be read from the IC memory card 31, it is judged that the inserted IC memory card 31 is of a wrong type.

If the correct IC memory card 31 is inserted at step 903, the residual capacity is determined (Step 904) and whether the IC memory card 31 has enough remaining storage capacity is checked (step 905). In this connection, if the storage capacity of the IC memory card 31 is enough to store the image data for at least one image, it is judged that there is a remaining storage capacity in the IC memory card 31, otherwise it is judged that the IC memory card has no remaining storage capacity.

If the IC memory card 31 has a remaining storage capacity at step 905, the recording of the image data in the image flash memory 20 is stopped (step 906), the memory card record mode is set (step 907) and the memory card record mode is indicated in the indicating portion 23 (step 908).

Thereafter, the image data, the recording of which in the image flash memory 20 has been previously stopped at step 906, is recorded in the record area of the IC memory card 41 that is selected to record the image data (step 909).

At step 909, the image data written in the image memory 7 is read therefrom and is subject to the signal processing operation in the image processor 8. The image data is then recorded in the record area of the IC memory card 31 that is selected to record the image data by the IC memory card control circuit 15. Namely, the image data for one image is directly recorded in the IC memory card 31.

Thereafter, the number of erasing operations is read from the erasure number counter 261 of the block of the image flash memory 20 which has been stopped from recording the image data and is written in the RAM of the system controller 2 (step 910).

Thereafter, the image data recorded in the block of the image flash memory 20 which has been stopped from recording the image data, i.e., the image data which was being written, is erased by the flash memory control circuit 19 (step 911).

At step 912, the number of erasures written in the RAM of the system controller 2 is increased by one. Thereafter, the number of erasures is read from the RAM of the system controller 2 and is written in the erasure number counter 261 of the block of the image flash memory from which block the image data has been erased, through the flash memory control circuit 19 (step 913).

If the image data is not being recorded in the image flash memory 20 at step 901; or if the inserted IC memory card is a wrong one at step 903; or if there is no remaining storage capacity in the IC memory card 31 at step 905; or if the operations at step 913 are completed, the program ends and control is returned to the main routine.

As may be understood from the above discussion, since the still video camera 1 according to the present invention is comprised of the flash memory 20 for the image and the loading portion 17 in which the IC memory card 31 can be loaded, the image photographed by the still video camera can be recorded in the image flash memory 20 or directly in the IC memory card 31. In particular, since the image is preferentially recorded in the IC memory card 31, the number of recording and erasing operations of the image data in, and from, the image flash memory can be reduced, thus resulting in an increased service life for the image flash memory 20.

In addition, since the number of erasing operations in each block of the image flash memory 20 is counted, if the number of erasing operations of a certain block reaches a predetermined value (guaranteed number of erasing operations), the image data is prohibited from recording in that block. Namely, the image data can only be recorded in the block which has a sufficient remaining storage capacity. Hence, not only can the reliability of the image data recorded in the image flash memory 20 be enhanced but also a high image quality can be ensured.

Moreover, since the memory card record mode at which the image data is recorded in the IC memory card 31, the flash memory record mode at which the image data is recorded in the image flash memory 20, and the record prohibition mode at which the recording of the image data is prohibited are automatically selected in accordance with predetermined requirements, such as an insertion of the IC memory card in the loading portion 17 of the still video camera, there is no failure to select the record mode and the operation can be simplified.

If the IC memory card 31 having a remaining storage capacity is loaded in the loading portion 17 (i.e., if the terminal of the IC memory card 31 is connected to the terminal of the connector 18 of the loading portion) during the recording operation of the image data in the image flash memory 20, the recording of the image data in the image flash memory 20 is stopped, and the recorded image data is erased from the image flash memory and is rewritten in the IC memory card 31. Consequently, for example, a photographer can record the image data in the IC memory card even after the releasing operation is carried out. In this case, if the IC memory card 31 is inserted in the loading portion 17, the recording medium is automatically switched from the image flash memory 20 to the IC memory card 31, and hence, the operation is simplified.

Note that although the LCD monitor 12 is used as an information display means in the illustrated embodiment, the present invention is not limited thereto. For example, an electronic viewfinder can be employed in place of the LCD monitor.

As can be seen from the above discussion, according to the present invention, since the image data can be recorded preferentially in the external memory (i.e., IC memory card) which can be detachably attached to the still video camera, the number of recording and erasing operations of the image data in and from the non-volatile memory (i.e., flash memory) for storing the image can be reduced, thus resulting in an increased service life for the non-volatile memory.

Moreover, since the image data, a part of which has been recorded in the image flash memory 20, i.e., the useless image data which does not form a complete image, is immediately erased, the utilization efficiency of the image flash memory 20 can be increased.

The structure of the still video camera according to the present invention is not limited to that of the illustrated embodiment.

Moreover, according to the present invention, when the electrical connection between the connecting portion and the non-volatile memory is detected by the connection detecting means during the recording of the image data in the non-volatile memory, the recording of the image data in the non-volatile memory is suspended and the image data is then recorded in the external memory. Thus, the recording medium is switched from the non-volatile memory to the external memory even during the recording of the image data in the non-volatile memory.

In this connection, since the recording medium is automatically switched when the external memory is connected to the connecting portion, the operation can be simplified.

Furthermore, a still video camera according to the present invention includes a record permission/prohibition judging means which detects the number of erasing operations in each recording unit area of the non-volatile memory to judge whether the image data can be recorded in the recording unit area in accordance with the detected result. The recording means permits or prohibits the image data to be recorded or from recording, and hence, the reliability of the image data recorded in the non-volatile memory can be increased.

What is claimed is:

1. A still video camera comprising:

an image pickup device;

a non-volatile memory, incorporated in said camera, in which an image taken by said image pickup device can be recorded or an image recorded therein can be erased;

an external memory, which is detachably attached to said camera, and which can store therein said image taken by said image pickup device;

connecting means to which said external memory is electrically connected; and, recording means for recording image signals of said image taken by said image pickup device in either said non-volatile memory or said external memory, wherein said recording means records said image signals in said external memory when said external memory is connected to said connecting means.

2. A still video camera according to claim 1, further comprising connection detecting means for detecting a connection between said connecting means and said external memory, wherein said recording means records said image signals in said external memory when said connection between said connecting means and said external memory is detected by said connection detecting means.

3. A still video camera according to claim 1, further comprising first remaining capacity detecting means for detecting a remaining storage capacity of said external memory, wherein said recording means records said image signals in said external memory when said external memory is connected to said connecting means and when said first remaining capacity detecting means detects that a storage capacity necessary to record the image signals for at least one image remains in said external memory.

4. A still video camera according to claim 1, further comprising remaining capacity detecting means for detecting a remaining storage capacity of said non-volatile memory, wherein said recording means records said image signals in said non-volatile memory when data can not be recorded in said external memory and when said remaining capacity detecting means detects that a storage capacity necessary to record the image signals for at least one image remains in said non-volatile memory.

5. A still video camera according to claim 1, wherein said external memory is an IC memory incorporated in an IC memory card.

6. A still video camera according to claim 1, further comprising first remaining capacity detecting means for detecting a remaining storage capacity of said external memory, wherein said external memory is connected with said connecting means and if said first remaining capacity detecting means detects that a storage capacity necessary to record the image signals for at least one image remains in said external memory during recording of said image signals in said non-volatile memory, said recording means stops recording said image signals in said non-volatile memory, and instead records said image signals in said external memory.

7. A still video camera comprising:

an image pickup device;

a non-volatile memory, incorporated in said camera, in which an image taken by said image pickup device can be recorded or an image recorded therein can be erased;

an external memory, which is detachably attached to said camera, and which can store therein said image taken by said image pickup device;

connecting means to which said external memory is electrically connected; and, recording means for recording image signals of said image taken by said image pickup device in said non-volatile memory or said external memory, wherein if said external memory is connected by said connecting means during recording of said image signals in said non-volatile memory, said recording means stops recording said image signals in said non-volatile memory, and records said image signals in said external memory.

8. A still video camera according to claim 7, further comprising first remaining capacity detecting means for detecting a remaining storage capacity of said external memory, wherein if said external memory is connected with said connecting means, and if said first remaining capacity detecting means detects that a storage capacity necessary to record the image signals for at least one image remains in said external memory during recording of said image signals in said non-volatile memory, said recording means stops recording said image signals in said non-volatile memory, and records said image signals in said external memory.

9. A still video camera comprising:

an image pickup device;

a non-volatile memory, incorporated in said camera, in which an image taken by said image pickup device can be recorded or an image recorded therein can be erased;

an external memory, which is detachably attached to said camera, and which can store therein said image taken by said image pickup device;

connecting means to which said external memory is electrically connected;

first remaining capacity detecting means for detecting a remaining storage capacity of said external memory; and, recording means for recording image signals of the image taken by said image pickup device in said non-volatile memory or said external memory, wherein if said external memory is connected with said connecting means, and if said first remaining capacity detecting means detects that a storage capacity necessary to record the image signals for at least one image remains in said external memory during recording of said image signals in said non-volatile memory, said recording means stops recording said image signals in said non-volatile memory, and records said image signals in said external memory.

10. A still video camera according to claim 9, further comprising erasing means for erasing said image signals recorded in said non-volatile memory or said external memory, wherein said erasing means erases said image signals recorded in said non-volatile memory after said recording of said image signals in said non-volatile memory is stopped.

11. A still video camera according to claim 9, wherein said external memory is an IC memory incorporated in an IC memory card.

12. A still video camera comprising:

an image pickup device;

a non-volatile memory incorporated in said camera, in which an image taken by said image pickup device can be recorded or an image recorded therein can be erased, said non-volatile memory being provided with a plurality of recording unit areas;

an external memory, which is detachably attached to said camera, and which can store therein said image taken by said image pickup device;

connecting means to which said external memory is electrically connected;

recording means for recording image signals of the image taken by said image pickup device in said non-volatile memory or said external memory;

erasing means for erasing said image signals recorded in at least said non-volatile memory; and, record judging means for detecting a number of erasing operations performed for each recording unit area of said non-volatile memory to thereby judge whether data can be recorded in said recording unit area, wherein said recording means performs or prohibits said recording of said image signals in one recording unit area, in accordance with a judgment of said record judging means.

13. A still video camera according to claim 12, wherein, said recording unit areas are each provided with an erasure number recording area in which erasure number data which represents said number of said erasing operations perform in associated recording unit areas is recorded; and said recording means records said number of said erasing operations perform in the erasure number recording areas each time data recorded in said recording unit areas of said non-volatile memory is erased by said erasing means.

14. A still video camera according to claim 12, wherein said record judging means detects said number of said erasing operations performed on an erasure number data, and compares a detected erasure number with a guaranteed erasure number, so that if said detected erasure number is greater than said guaranteed erasure number, a judgment is made that no data is permitted to be recorded in associated recording unit areas.

15. A still video camera according to claim 12, wherein said recording means records said image signals in said recording unit area corresponding to a smallest erasure number selected from each of said recording unit areas having an erasure number that is less than a guaranteed erasure number.

16. A still video camera according to claim 12, further comprising a record prohibition data recording portion in which data representing whether the recording unit areas in which no image signal is permitted, are recorded.

17. A still video camera according to claim 12, wherein said external memory is an IC memory incorporated in an IC memory card.

18. A still video camera comprising:

an image pickup device;

a non-volatile memory, incorporated in said camera, in which an image taken by said image pickup device can be recorded or an image recorded therein can be erased, said non-volatile memory being provided with a plurality of recording unit areas;

recording means for recording image signals of said image taken by said image pickup device in said non-volatile memory along with recording time; and, recording time allotting means for allotting a frame number to said image signals recorded in said non-volatile memory in which said image signals has been recorded, in order of said recording time.

19. A still video camera according to claim 18, further comprising, erasing means for erasing said image signals recorded in said non-volatile memory in order of said frame number.

* * * * *